US011106718B2

(12) United States Patent
Krasadakis et al.

(10) Patent No.: US 11,106,718 B2
(45) Date of Patent: Aug. 31, 2021

(54) CONTENT MODERATION SYSTEM AND INDICATION OF RELIABILITY OF DOCUMENTS

(71) Applicant: Accenture Global Solutions Limited, Dublin (IE)

(72) Inventors: Georgios Krasadakis, Dublin (IE); Orlaith Burke, Greystones (IE); Morgan Commons, Galway (IE); Medb Corcoran, Dublin (IE); Mohammad Karzand, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 538 days.

(21) Appl. No.: 15/835,757

(22) Filed: Dec. 8, 2017

(65) Prior Publication Data

US 2019/0179956 A1 Jun. 13, 2019

(51) Int. Cl.
| | | |
|---|---|---|
| *G06F 16/958* | (2019.01) | |
| *G06F 16/38* | (2019.01) | |
| *G06F 7/02* | (2006.01) | |
| *G06F 16/33* | (2019.01) | |
| *G06F 16/93* | (2019.01) | |
| *G06F 40/35* | (2020.01) | |
| *G06F 16/955* | (2019.01) | |

(52) U.S. Cl.
CPC ............. *G06F 16/38* (2019.01); *G06F 7/02* (2013.01); *G06F 16/3334* (2019.01); *G06F 16/3344* (2019.01); *G06F 16/93* (2019.01); *G06F 16/955* (2019.01); *G06F 16/958* (2019.01); *G06F 16/9566* (2019.01); *G06F 40/35* (2020.01)

(58) Field of Classification Search
CPC ...... G06K 2009/00738; G06F 16/7867; G06F 16/24575; G06F 16/955; G06F 16/9566; G06F 16/58; G06F 16/93; G06F 16/583; G06F 16/958; G06F 16/3344; H04L 67/02
USPC ........................................................ 707/690
See application file for complete search history.

(56) References Cited

U.S. PATENT DOCUMENTS

| | | | | |
|---|---|---|---|---|
| 7,697,791 | B1 * | 4/2010 | Chan ................... | G06Q 30/0263 382/305 |
| 8,126,882 | B2 * | 2/2012 | Lawyer ................... | G06F 16/23 707/723 |
| 2017/0346845 | A1 * | 11/2017 | Dinerstein ............. | G06N 5/048 |

OTHER PUBLICATIONS

Sirajudeen et al., "Online Fake News Detection Algorithm" Journal of Theoretical and Applied Information Technology, Sep. 15, 2017 vol. 95 No. 17: 4114-4122.

(Continued)

*Primary Examiner* — Marcin R Filipczyk
(74) *Attorney, Agent, or Firm* — Fish & Richardson P.C.

(57) ABSTRACT

This document describes systems, methods, devices, and other techniques for performing content moderation. In some implementations, a computing device receives input data in relation to an electronic document. The computing device generates, based on the received input data, data representing one or more features of the electronic document and analyzes the generated data representing one or more features of the electronic document to determine one or more reliability scores indicating respective measures of reliability of the electronic document. The reliability scores include one or more of (i) a content reliability score, (ii), an author reliability score, and (iii) a domain reliability score. The computing device indicates, based on one or more of the reliability scores, whether the electronic document is reliable or not.

13 Claims, 11 Drawing Sheets

(56) References Cited

OTHER PUBLICATIONS

Figueira et al., "Abstract: The current state of fake news:challenges and opportunities," CENTERIS—International conference on enterprise information systems/projman—international conference on project management/hcist—international conference on health and social care information systems and technologies, CENTERIS/projman/hcist Nov. 8-10, 2017, 10 pages.

Conroy et al., "Automatic deception detection: methods for finding fake news," Presented at Proceedings of ASSIST '15, St. Louis, MO, Nov. 6-10, 2015, 4 pages.

Bajaj, "The pope has a new baby! Fake news detection using deep learning", Project, Stanford University, Winter 2017, 8 pages.

* cited by examiner

CONTENT MODERATION SYSTEM AND INDICATION OF RELIABILITY OF DOCUMENTS

TECHNICAL FIELD

This specification generally relates to methods, systems, devices, and other techniques for detection and remediation of fake news.

BACKGROUND

Fake news is a type of journalism or propaganda including deliberate misinformation or hoaxes spread via traditional print, online print, broadcast news media or online social media. Fake news is written and published with the intent to mislead in order to damage an agency, entity, or person, and/or gain financially or politically, often with sensationalist, exaggerated, or patently false headlines that grab attention. Fake news undermines serious media coverage and makes it more difficult for journalists to cover significant news stories.

SUMMARY

Innovative aspects of the subject matter described in this specification may be embodied in methods that include the actions of receiving input data in relation to an electronic document; generating, based on the received input data, data representing one or more features of the electronic document; analyzing the generated data representing one or more features of the electronic document to determine one or more reliability scores indicating respective measures of reliability of the electronic document, wherein the reliability scores comprise one or more of (i) a content reliability score, (ii), an author reliability score, and (iii) a domain reliability score; and indicating, based on one or more of the reliability scores, whether the electronic document is reliable or not.

Other embodiments of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus (e.g., one or more computers or computer processors), cause the apparatus to perform the actions.

The foregoing and other embodiments can each optionally include one or more of the following features, alone or in combination. In some implementations the one or more features comprise: electronic document title, and/or authors of the electronic document, and/or date the electronic document was released, and/or summary of the electronic document, and/or hosted domain, and/or multimedia content included in the electronic document, and/or link sources of the electronic document, and/or references included in the electronic document, and/or style of the electronic document.

In some implementations a content reliability score for an electronic document comprises a score representing a likelihood that the content of the electronic document is reliable, and analyzing the generated data to determine a content reliability score comprises: analyzing the generated features to determine one or more of (i) a sentiment score, (ii) summary reliability score, (iii) multimedia score, or (iv) style reliability score; and determining the content reliability score based on a combination of one or more of the determined (i) sentiment score, (ii) summary reliability score, (iii) multimedia score, or (iv) style reliability score.

In some implementations analyzing the generated data to determine a content reliability score for the electronic document comprises: analyzing the electronic document to identify (i) one or more entities referenced in the electronic document, and (ii) a summary of the electronic document; searching one or more databases using the identified one or more entities referenced in the electronic document and the summary of the electronic document to identify one or more relevant electronic documents; determining, a similarity score between the electronic document and each identified one or more relevant electronic documents; constructing a set of relevant electronic documents with similarity scores that exceed a first predetermined threshold; obtaining, for each of the relevant electronic documents in the set, a respective domain reliability score for the relevant electronic document; filtering the set of relevant electronic documents to include relevant electronic documents whose domain reliability score exceeds a second predetermined threshold; and defining the content reliability score to equal the number of electronic documents in the filtered set.

In some implementations an author reliability score comprises a score representing a likelihood that electronic documents written by the author are reliable, and analyzing the generated data to determine an author reliability score comprises: identifying an author of the electronic document; identifying, from a database of stored electronic documents, one or more similar electronic documents and, for each similar electronic document, respective authors of the similar electronic document; identifying, for each similar electronic document, a respective content reliability score for the similar electronic document; identifying, for each identified author of a similar electronic document, a current respective author reliability score; computing an author reliability score for author of the electronic document based at least on the identified content reliability scores for the similar electronic documents and the identified author reliability scores for the authors of the similar electronic documents.

In some implementations the method further comprises, in response to determining that the computed author reliability score exceeds a predetermined author reliability threshold, classifying the author as a reliable author and storing data indicating that the author is reliable.

In some implementations the method further comprises determining an author authenticity score; and adjusting the computed author reliability score based on the determined authenticity score.

In some implementations a domain reliability score comprises a score representing a likelihood that electronic documents hosted on the domain are reliable, and analyzing the generated data to determine a domain reliability score comprises: identifying a domain that is hosting the electronic document; identifying, from a database, a current reliability score for the identified domain; receiving data in relation to crowdsourced information about the identified domain; determining a crowdsource reliability score based on the received data; and determining the domain reliability score based on the current reliability score and the crowdsourced score.

In some implementations determining the domain reliability score based on the current reliability score and the crowdsourced score comprises determining and selecting (i) a minimum, (ii) an average, or (iii) combination of the current reliability score and crowdsourced score.

In some implementations analyzing the multimedia content comprises: performing one or more of (i) image recognition, (ii) video analysis or (iii) object analysis to determine properties of the multimedia content, comprising one or more of (i) objects shown in the multimedia content, (ii) a date of origin of the multimedia content, or (iii) a location shown in the multimedia content.

In some implementations the method further comprises, in response to indicating that the electronic document is not reliable, (i) flagging the electronic document, (ii) controlling access to the electronic document, or (iii) censoring or moderating some or all of the electronic document; and in response to indicating that the electronic document is reliable, (i) upselling the electronic document, or (ii) recommending the author of the electronic document.

In some implementations the method further comprises receiving multiple data inputs in relation to respective electronic documents; for each electronic document: generating data representing one or more features from the electronic document, analyzing the generated data to determine one or more reliability scores indicating a measure of reliability of the electronic document, wherein the reliability scores comprise one or more of (i) an author reliability score, (ii) a content reliability score, or (iii) a domain reliability score; and indicating, based on one or more of the reliability scores, whether the electronic document is reliable or not; and modeling, based on indicating whether the multiple electronic documents are reliable or not, the propagation of unreliable electronic documents.

In some implementations the method further comprises receiving multiple data inputs in relation to respective electronic documents; for each electronic document: generating data representing one or more features from the electronic document, analyzing the generated data to determine one or more reliability scores indicating a measure of reliability of the electronic document, wherein the reliability scores comprise one or more of (i) an author reliability score, (ii) a content reliability score, or (iii) a domain reliability score; and indicating, based on one or more of the reliability scores, whether the electronic document is reliable or not; arranging the multiple electronic documents according to subject; and systematically reviewing, based on indicating whether the multiple electronic documents are reliable or not, the multiple electronic documents on a given subject.

In some implementations indicating whether the electronic document is reliable or not based on one or more of the reliability scores comprises: determining an aggregated reliability score, wherein the aggregated reliability score comprises a weighted linear combination of two or more of (i) the author reliability score, (ii) the content reliability score, and (iii) the domain reliability score; determining whether the aggregated reliability score exceeds a predetermined threshold; in response to determining that the aggregated reliability score exceeds the predetermined threshold, indicating that the electronic document is reliable; and in response to determining that the aggregated reliability score does not exceed the predetermined threshold, indicating that the electronic document is unreliable.

In some implementations indicating whether the electronic document is reliable or not based on one or more of the reliability scores comprises: determining whether the domain reliability score for the electronic document exceeds a predetermined domain reliability score threshold, wherein a domain is determined to host reliable electronic articles if a domain reliability score associated with the domain exceeds the domain reliability score threshold; in response to determining that the domain reliability score exceeds the predetermined domain reliability score threshold, indicating that the electronic document is reliable; in response to determining that the domain reliability score does not exceed the predetermined domain reliability score threshold, determining whether the content reliability score for the electronic document exceeds a predetermined content reliability score threshold, wherein content of an electronic document is determined to comprise reliable content if a content reliability score associated with the content of the electronic document exceeds the content reliability score threshold; in response to determining that the content reliability score exceeds the predetermined content reliability score threshold, indicating that the electronic document is reliable; in response to determining that the content reliability score does not exceed the predetermined content reliability score threshold, determining whether the author reliability score for the electronic document exceeds a predetermined author reliability score threshold, wherein an author is determined to produce reliable electronic documents if an author reliability score associated with the author exceeds the author reliability score threshold; in response to determining that the author reliability score exceeds the predetermined author reliability score threshold, indicating that the electronic document is reliable; in response to determining that the author reliability score does not exceed the predetermined author reliability score threshold, indicating that the electronic document is unreliable.

Some implementations of the subject matter described herein may realize, in certain instances, one or more of the following advantages. A content moderation system, as described in this specification, may be used to improve the quality of content, e.g., articles in a newspaper, magazine or other publication, audio content, video content or other forms of rich content. For example, a content moderation system may be used to reduce the propagation of fake news, to censor inappropriate or misleading content, or to increase content accuracy.

A content moderation system, as described in this specification, identifies and moderates inaccurate and unreliable content by determining multiple measures of reliability, e.g., author reliability, author authenticity, domain reliability and content reliability. Individual measures of reliability are then analyzed or appropriately combined to provide an indication of whether content is reliable or not. By considering different types of reliability in this manner, the content moderation system may more efficiently and effectively identify unreliable content. In addition, a content moderation system, as described in this specification, provides an algorithm that captures how trust can be established online.

The details of one or more embodiments of the subject matter described in this specification are set forth in the accompanying drawings and the description below. Other potential features, aspects, and advantages of the subject matter will become apparent from the description, the drawings, and the claims.

DESCRIPTION OF DRAWINGS

Like reference symbols in the various drawings indicate like elements.

DETAILED DESCRIPTION

Figure 1:
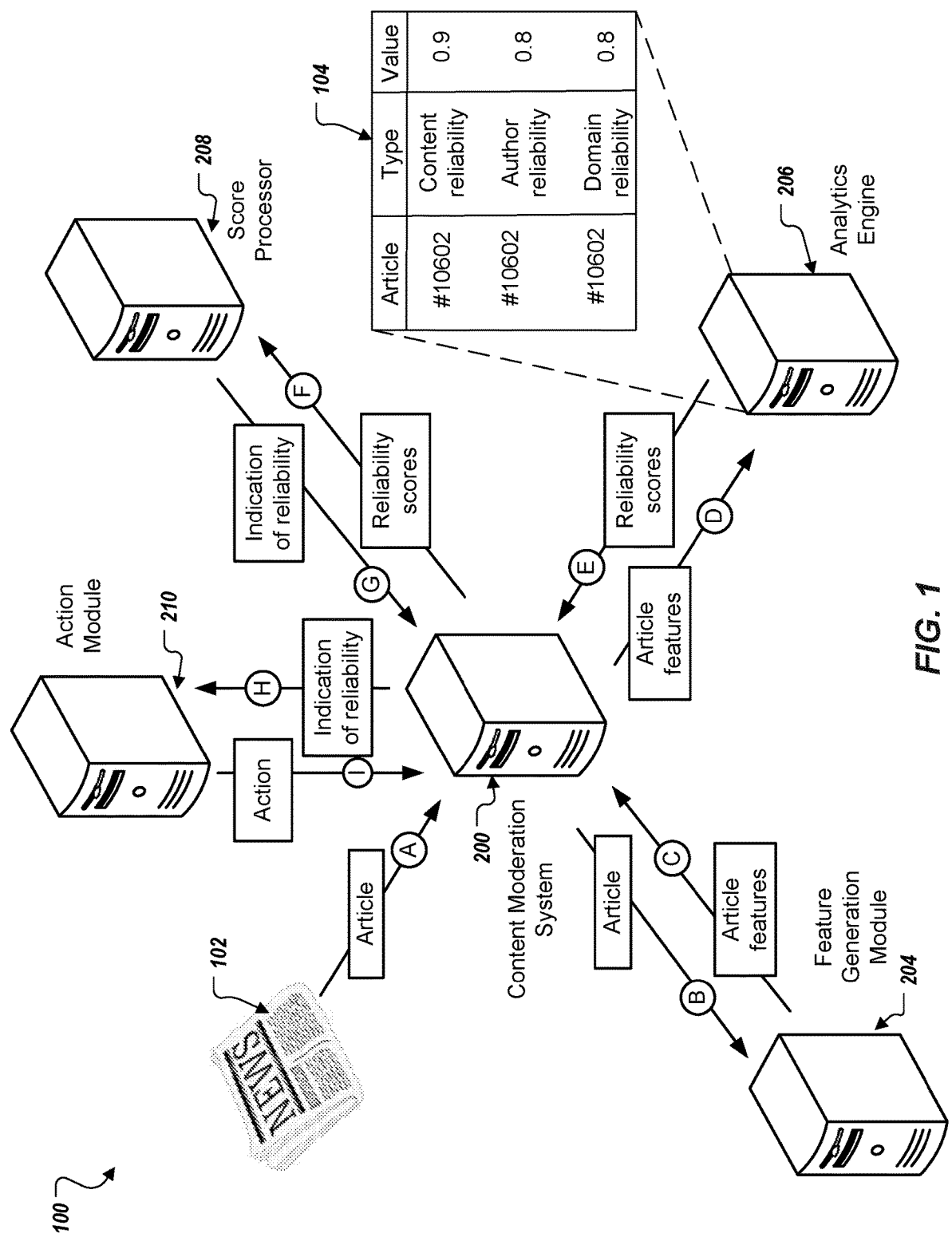
FIG. 1 depicts a conceptual block diagram of an example content moderation computing system performing a process of content moderation.

This specification generally describes systems, methods, devices, and other techniques for determining whether electronic content, e.g., documents, articles, video or audio, is reliable or not. For example, the system can be used to provide an indication of whether an electronic document includes fake news and/or is in need of censoring.

The system receives data in relation to an electronic document, e.g., data representing the content of an article and metadata associated with the article, and other relevant data such as user comments related to the electronic document. The system extracts features from the electronic document. The features can include the title of the electronic document, authors of the electronic document, a date the electronic document was released, a summary of the electronic document, a domain hosting the electronic document, multimedia content included in the electronic document, link sources of the electronic document, references included in the electronic document, the style of the electronic document. The features are analyzed to determine multiple reliability scores that each indicate a different measure of reliability of the electronic document. The reliability scores include author reliability scores, domain reliability scores and content reliability scores.

An author reliability score is similar to an academic H-index. Authors may be assigned higher author reliability scores if their work is corroborated by other authors. For example, the system can maintain a database of previously analyzed content. To generate an author reliability score for a current item of content, the system can access the database to identify previous items of content that are similar to the current content. An author reliability score for the author of the current content can then be generated based on the previous items of content, e.g., if an item of content is corroborated by 100 previously written items with high reliability scores, the author of the current item of content can be assigned a high reliability score.

A domain reliability score indicates whether a domain is generally hosting reliable content or not. Generating a domain reliability score includes combining previous information about the domain, e.g., its previous reputation, and current information, e.g., current crowdsourced information from the internet. Both sources of information can be stored by the system in a database.

A content reliability score indicates whether content (in this context content is understood to mean information included in an electronic document (such as an electronic article), audio or video), e.g., facts, figures, images or quotations, are reliable or not.

The different reliability scores are combined or aggregated to generate a final reliability score for the online content. The final reliability score can be used to flag the online content as fake news, control access to the content, censor or moderate some of all of the content, upsell the content or recommend the content/the author of the content. In some cases the above process can be repeated for several different items of content to enable systematic reviews of content on a given subject, or to model the propagation of unreliable or reliable content.

For convenience, the term "article" is used throughout the specification as an example of a type of electronic document or content whose reliability may be determined using the techniques described herein. However, as described above, the systems and methods described in this specification may equally be applied to any item of electronic content, as well as audio content, video content or any other form of rich content.

FIG. 1 depicts a conceptual block diagram 100 of an example content moderation computing system 200 performing a content moderation process. The system 200 can be enabled to receive input data that represents electronic content, e.g., article 102. The input data can be processed to generate data representing features of the article. The system 200 analyzes the generated data representing one or more features of the article to determine reliability scores indicating respective measures of reliability of the article. The determined reliability scores are used to indicate whether the article is reliable or not. The system 200 may provide data indicating one or more actions to be taken in response for determining whether the article is reliable or not. For example, the system may provide data indicating that an article should be censored or moderated. Generally, the system 200 can be implemented as a system of one or more computers having physical hardware like that described with respect to FIG. 10.

Briefly, the system 200 includes a feature generation module 204, an analytics engine 206, a score processor 208, and an action module 210. The components of the system 200 can exchange electronic communications over one or more networks, or can exchange communications in another way, such as over one or more wired or wireless connections. As depicted in FIG. 1, the content moderation process can be accomplished by the system 200.

During stage (A) of the content moderation process, the content moderation system 200 receives data representing content, e.g., article 102. For example, the received data may represent a piece of writing published in a newspaper, magazine, blog or social network. As described above, for convenience the received data is described herein as representing an article, however in some implementations the received data may represent other electronic content such as video content, audio content, or other rich context. In some implementations the received data may further include metadata describing the content, e.g., its structural elements, as well as data representing feedback, reactions to and references to the content, e.g., online user generated content.

During stage (B), the content moderation system 200 can transmit data that represents the article 102 to the feature generation module 204. The feature generation module 204 can receive the data representing the article 102 and process the received data to generate data representing one or more features of the article.

The one or more features of the article may include visible features such as a title of the article, list of authors and contact information of those who contributed to the article, date of publication of the article, keywords associated with the article, summary or abstract of the article, entities referenced in the article, multimedia content such as images or video included in the article, references or link sources included in the article, font or colours used in the article typeface, or the name of the domain hosting the article. The one or more features of the article may further include one or more inferred features such as an article sentiment or topic, anomalies that appear in the article, a story the article tells, a network associated with the author, or a network associated with the domain. An example feature generation module 204 is described below with reference to FIGS. 2A and 2B. Generating data representing one or more features of an article or other content is described below with reference to FIG. 3.

During stage (C) the feature generation module 204 may transmit data that represents the generated data representing features of the article to the content moderation system 200. During stage (D), the content moderation system 200 may transmit data that represents the generated features of the article to the analytics engine 206.

The analytics engine 206 can receive the generated data that represents the features of the article and analyze the received data to determine reliability scores indicating respective measures of reliability of the article. In some implementations the analytics engine 206 may further receive, from the content moderation system 200, metadata describing the article as well as data representing feedback, reactions to and references to the article, as described above with reference to stage (A). The analytics engine 206 may use this additional data when determining the reliability scores.

The measures of reliability may include content reliability, e.g., a measure indicating whether or not the content included in an article is accurate and not misleading. The measures of reliability may further include author reliability, e.g., a measure indicating whether authors of an article are known to publish accurate, fact-based articles or to publish inaccurate, "fake" articles whose content deviates from reality and/or are emotionally biased. The measures of reliability may further include domain reliability, e.g., a measure indicating whether a domain hosting an article is known to host accurate, fact-based articles that are written by authors with a reputation for producing reliable articles.

In some implementations the measures of reliability may indicate a level of reliability, e.g., a measure of 0.9 if the article is reliable or a measure of 0 if it is completely unreliable, and how emotionally loaded the article is, e.g., determined using sentiment analysis. For example, a measure of how emotionally loaded the article is may be used to adjust an initially assigned measure of reliability. An example analytics engine is described in detail below with reference to FIG. 2A. Determining reliability scores that indicate respective measures of reliability of an article are described below with reference to FIGS. 4-7.

During stage (E) the analytics engine 206 may transmit data that represents that determined reliability scores to the content moderation system 200. For example, as shown in FIG. 1, the analytics engine 206 may transmit data representing the contents of table 104 to the content moderation system 200. During stage (F), the content moderation system 200 may transmit data that represents the determined reliability scores to the score processor 208.

The score processor 208 can receive the data that represents the determined reliability scores. In some implementations the score processor 208 may adjust or normalize the reliability scores represented by the received data so that the reliability scores can be meaningfully combined or compared. For example, the score processor 208 may normalize the reliability scores such that each score is represented by a respective percentage.

The score processor 208 processes the received data representing the determined reliability scores or data representing normalized reliability scores to generate an indication of whether the article is reliable or not. For example, the score processor 208 may aggregate values (optionally normalized values) of the reliability scores to determine an overall reliability score. The score processor 208 uses the overall reliability score to indicate whether the article is reliable or not. For example, the score processor 208 may determine whether the overall reliability score exceeds a predetermined threshold, e.g., user specified threshold, or not. If the overall reliability score exceeds the predetermined threshold, the score processor 208 may generate data representing an indication that the article is reliable. If the overall reliability score does not exceed the predetermined threshold, the score processor 208 may generate data representing an indication that the article is not reliable.

As another example, the score processor 208 may analyze the received data representing the determined reliability scores in turn to generate an indication of whether the article is reliable or not. In some implementations the indication may include a level of unreliability or reliability, e.g., a measure of how unreliable or reliable the article is. For example, the score processor 208 may identify, from the receive data, data representing a domain reliability score. The score processor 208 may indicate whether the domain reliability score exceeds a corresponding domain reliability score threshold or not. If the domain reliability score exceeds the corresponding domain reliability score threshold, the score processor 208 may generate data representing an indication that the article is reliable. If the domain reliability score does not exceed the corresponding domain reliability score threshold, the score processor 208 may repeat the analysis for a second and third reliability score. Processing reliability scores to generate an indication as to whether an article is reliable or not are described below with reference to FIGS. 8 and 9.

During stage (G) the score processor 208 may transmit data that represents a generated indication of whether the article is reliable or not to the content moderation system 200. In some implementations the content moderation system 200 may provide the generated indication of whether the article is reliable or not as a system output.

In other implementations, during stage (H), the content moderation system 200 may transmit data that represents the generated indication of reliability to the action module 210. The action module 210 can receive the data representing the generated indication of reliability and determine one or more actions to be performed based on the generated indication of reliability. For example, the action module 210 may receive data representing an indication that the article 102 is unreliable. In response thereto, the action module 210 may mark the content as being unreliable, or may determine that the article 102 should be censored and/or that access to the article should be controlled. In some cases the severity of the determined actions may depend on a level of reliability or unreliability in a generated indication. As another example, the action module 210 may receive data representing an indication that the article 102 is reliable. In response thereto, the action module 210 may determine that the article 102 should be upsold, e.g., that the article should be promoted to a more prominent position of the hosting domain, e.g., a first page, a first position in a list of search query results or in a selected media section.

During stage (I) the action module 210 may transmit data that represents the generated actions to the content moderation system 200. The content moderation system 200 may receive the data representing the generated actions and may implement the generated actions.

In some implementations the content moderation system 200 may store some or all of the data received from one or more of the feature generation module 204, analytics engine 206, score processor 208, or action module 210. For example, the content moderation system 200 may maintain one or more databases that store, for each received input, data representing an item of content or features of the item of content, data representing determined reliability scores, and data representing indications of whether the item of content or other features of the item of content are reliable or not. The stored data may be accessed during future content moderation processes, for example as described below with reference to FIGS. 5-7.

Figure 2A:
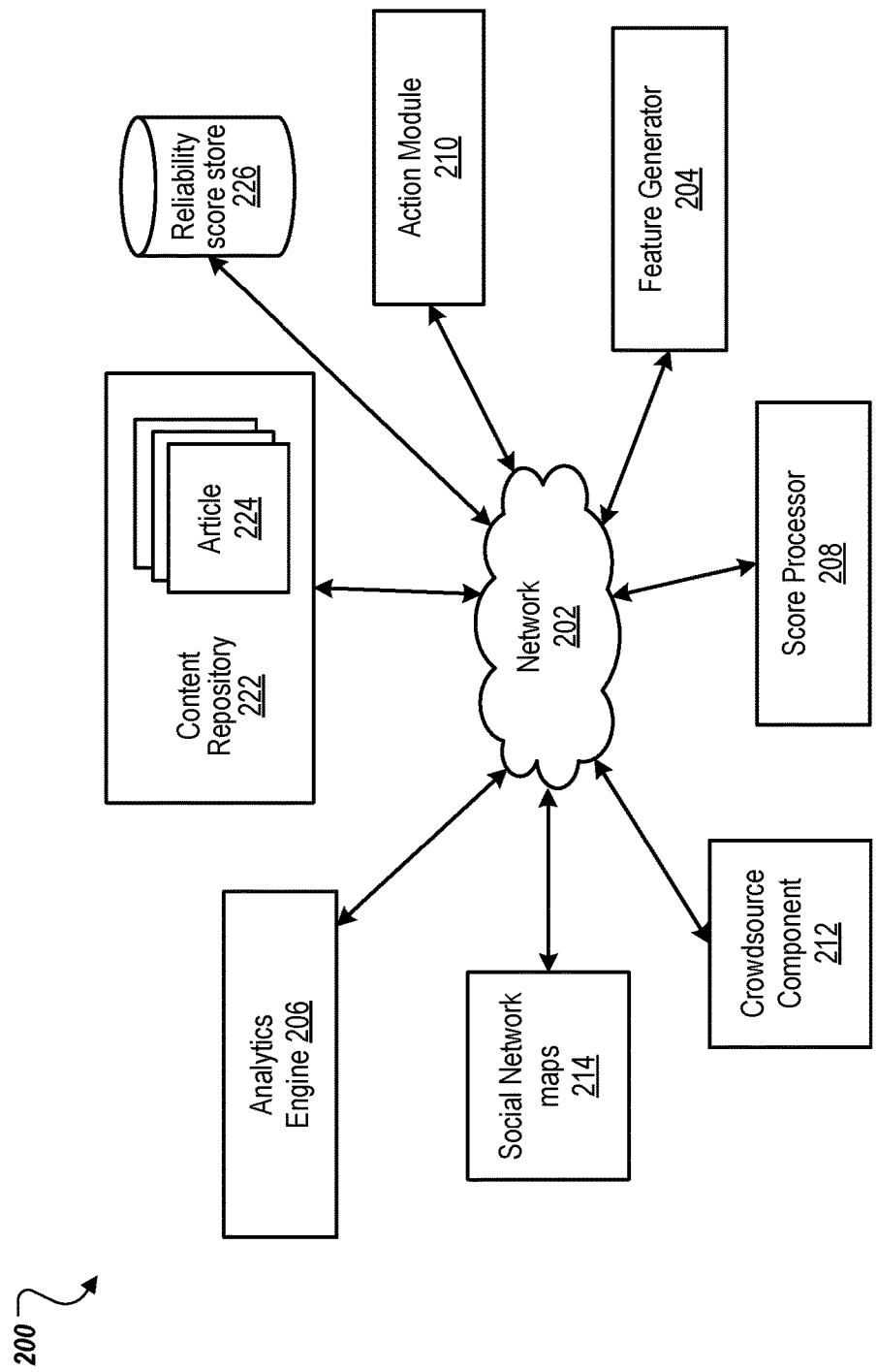
FIG. 2A depicts an example content moderation system.

FIG. 2A depicts an example content moderation system. In some implementations, a computer network 202, such as a local area network (LAN), wide area network (WAN), the Internet, or a combination thereof, connects content repository 222, analytics engine 206, feature generator 204, score processor 208, action module 210, social network maps 214 and crowdsource component 212. In some implementations, all or some of the electronic document repository 222, analytics engine 206, feature generator 204, score processor 208, action module 210, social network maps 214 and crowdsource component 212 can be implemented in a single computing system, and may communicate with none, one, or more other components over a network.

Content repository 222 includes one or more items of electronic content. Example items of electronic content include electronic documents such as pieces of writing published in a newspaper, magazine, or online. For example, the content repository 222 may include data in relation to one or more articles, e.g., article 224. Other example items of content include video content, audio content or other forms of rich content. Content repository 222 may further include other data associated with the one or more items of content. For example, content repository 222 may include data representing the content of an article, as well as metadata describing properties of the article such as its structural elements, or data representing feedback, references or reactions to the content, e.g., user generated content such as comments on the article or shares.

Feature generator 204 is configured to extract or generate data representing features of items of content included in content repository 222. For example, feature generator 204 may be configured to extract data representing one or more visible features of an item of content, e.g., a title of the item of content, list of authors and contact information of those who contributed to the item of content, date of publication of the item of content, keywords associated with the item of content, summary or abstract of the item of content, entities referenced in the content, multimedia content such as images or video included in the item of content, references or link sources included in the item of content, font or colours used in the content typeface, or the name of the domain hosting the content.

Feature generator 204 may be further configured to generate data representing inferred features of an item of content, e.g., content sentiment or topic, anomalies that appear in the item of content, a story the content tells, a network associated with the author of the content, or a network associated with the domain. In some implementations feature generator 204 may be configured to access or store one or more knowledge bases or other sources of information to generate the data representing inferred features. For example, to generate data representing a sentiment of the item of content, feature generator 204 may access one or more mappings that link words or phrases to particular sentiments.

Feature generator 204 may be further configured to analyze audio content, video content, or multimedia content included in an item of content, and identify features of the audio content, video content or multimedia content. The features may include visible/audible features such as entities, locations or text shown/heard in the video or audio content, or other features such as a time or date associated with the video or audio content. Feature generator 204 may analyze audio or video content using techniques such as optical character recognition, image recognition, speech recognition, video analysis or object analysis.

Feature generator 204 may be configured to generate a structured dataset that characterizes an item of content based on extracted and generated features of the item of content. Generated structured datasets may be stored, e.g., in database 226 as described below. An example feature generator 204 is illustrated below with reference to FIG. 2B.

Analytics engine 206 is configured to receive data representing extracted or generated features of an item of content and analyze the data to determine one or more reliability scores indicating respective measures of reliability of the item of content. For example, the analytics engine 206 may include one or more classifiers corresponding to respective measures of reliability that process data representing extracted or generated features of an item of content and classify the item of content as being reliable or not. For example, the analytics engine 206 may include a domain reliability classifier that is configured to process data representing extracted or generated features of an item and classify the item of content as coming from a reliable domain or an unreliable domain. Classifying the item of content as coming from a reliable domain or an unreliable domain may include generating a corresponding domain reliability score, e.g., a percentage that indicates a likelihood that that domain is reliable. Similarly the analytics engine 206 may include an author reliability classifier and a content reliability classifier.

In some implementations the analytics engine 206 may be configured to receive additional data from one or more other sources. For example, the analytics engine 206 may receive data from one or more social network maps 214 or from crowdsource component 212. Social network maps 214 may store data representing connections between authors. Such connections may be used to adjust a reliability score of an article written by a particular author. For example, if two authors write an article on a same topic with similar content, and the authors are connected via social network maps, e.g., are colleagues or friends, the analytics engine 206 may assign the author or article a lower author or content reliability score compared to a score assigned to two authors that are not connected, e.g., are independent.

Crowdsource component 212 may be configured to store and provide crowdsourced information about features of items of content. For example, crowdsource component 212 may monitor social network platforms or news outlets and identify trending topics or opinions. The crowdsource component 212 may provide data representing such topics or opinions to the analytics engine 206.

Data received from the social network maps 214 or crowdsource component 212 may be used by the analytics engine 206 to determine the one or more reliability scores or to adjust already determined reliability scores. For example, data received from the crowdsource component 212 may indicate that public opinion currently suggests that a particular domain or author has been accused of promoting fake news. The data may be used by the domain or author reliability classifiers included in the analytics engine 206 to determine respective reliability scores or to adjust, e.g., lower, already determined reliability scores.

Reliability scores determined by the analytics engine 206 may be stored by the system 200. For example, determined reliability scores may be included in the structured datasets generated by the feature generator 204 and stored in the database 226.

The score processor 208 is configured to process reliability scores generated by the analytics engine 206. For example, the score processor 208 may be configured to aggregate or otherwise combine generated reliability scores. The score processor 208 is further configured to indicate whether an item of content is reliable or not using reliability scores for the item of content. For example, the score processor 208 may be configured to compare reliability scores or aggregated reliability scores to predetermined thresholds to indicate whether an item of content is reliable or not, as described below with reference to FIGS. 8 and 9.

Action module 210 is configured to determine actions that may be taken by the content moderation system in response to indications received from the score processor 208. For example, in response to receiving an indication that an item of content is reliable from the score processor 208, the action module 210 may be configured to determine that the item of content should be recommended or that the author of the item of content should be recommended. Conversely, in response to receiving an indication that an item of content is unreliable from the score processor 208, the action module 210 may be configured to determine that the item of content should be censored or removed from the domain. In some cases an action generated by the action module 210 may depend on a level of reliability or unreliability provided by the score processor 208.

Figure 2B:
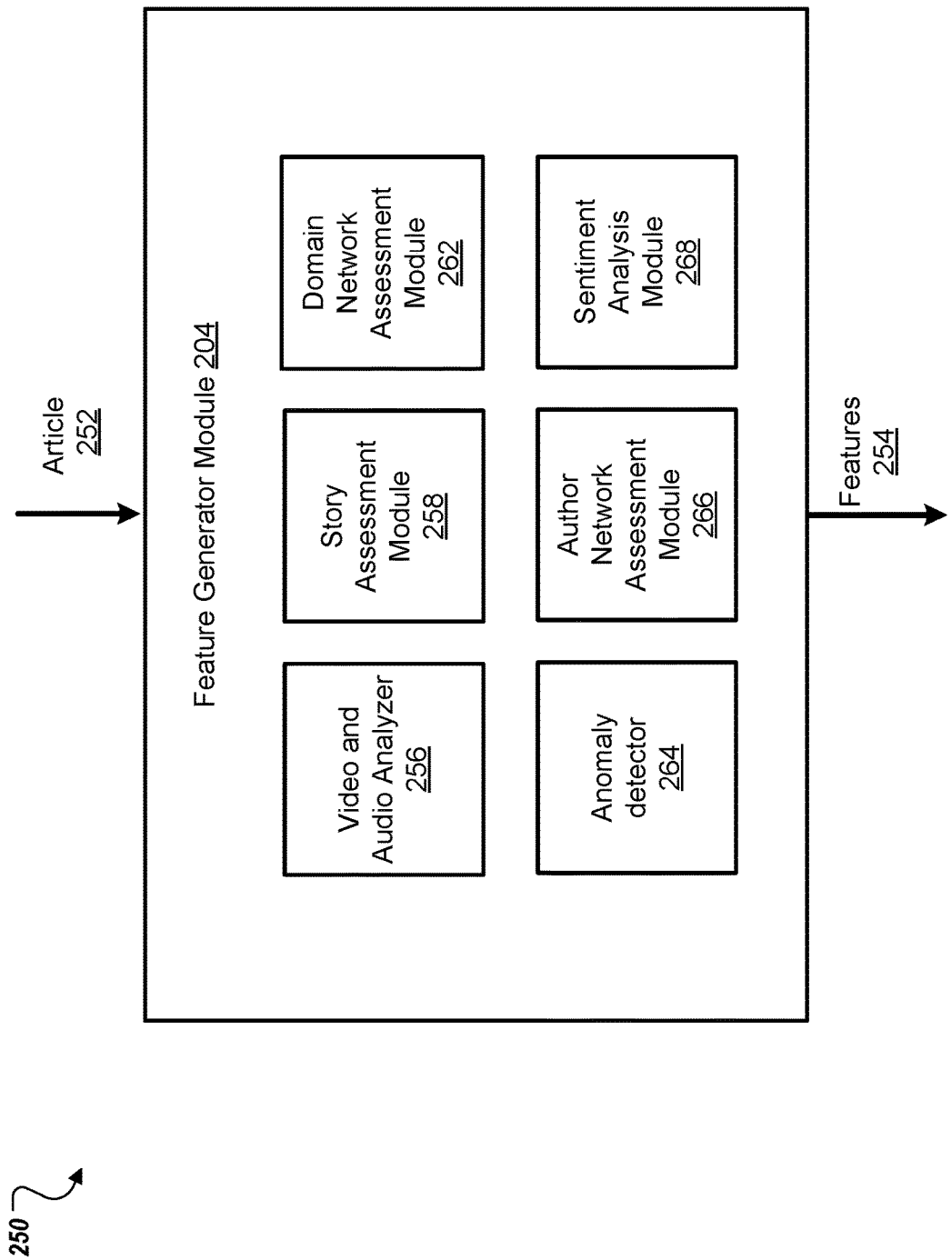
FIG. 2B depicts an example feature generation module.

FIG. 2B depicts an example feature generation module 204. The example feature generation module 204 may include multiple components that are configured to extract or generate different types of features of an item of content. For example, as shown in FIG. 2B, the feature generation module 204 may include a video and audio analyzer 256, a story assessment module 258, a labelling module 260, a domain network assessment module 262, an anomaly detector 264, an author network assessment module 266, and a sentiment analysis module 268.

As described above with reference to FIG. 2A, the feature generation module 204 is configured to receive as input data representing an item of content, e.g., data representing an electronic document or article 252. The feature generation module 204 processes the received input data using one or more of the multiple components 256-268 to generate or extract features of the item of content.

The video and audio analyzer 256 is configured to analyze items of content that include video or audio items. The video and audio analyzer may generate data representing features of analyzed video and audio, including data representing properties of the video or audio such as length or quality, as well as features shown or described in the video and audio, including entities shown or described, text shown or spoken, locations shown or described. Data generated by the video and audio analyzer 256 may be provided to other components in the feature generation module 204.

The story assessment module 258 may receive features extracted from an item of content, e.g., a summary of the item of content and entities referenced by the item of content, and may generate data representing a story described by the item of content. For example, the story assessment module 258 may be configured to process a summary of the item of content and entities referenced by the item of content to generate a structured story or pattern that can be used by the analytics engine 206 to compare to other structured stories or patterns that are known to be reliable and factual. For example, the story assessment module 258 may access one or more templates and populate the templates based on the received data representing features of the item of content. An example template includes "<entity A> performed <activity B> resulting in <action C> at <location D> on <date E>.

The domain network assessment module 262 may receive features extracted from an item of content, e.g., an identified domain hosting the item of content, and may generate data representing a network associated with the identified domain. For example, the domain network assessment module 262 may generate data representing a list of similar domains, e.g., domains funded by a same organization.

The anomaly detector 264 may receive features extracted from an item of content and may generate data representing anomalies found in the item of content. For example, the anomaly detector 264 may receive data representing entities extracted from a picture or photo included in an item of content. The anomaly detector 264 may analyze the entities to determine whether the entities match other content in the item of content, e.g., a text caption or summary. If the entities do not match, the anomaly detector 264 may generate data indicating that the picture or photo is anomalous.

The author network assessment module 266 may receive features extracted from an item of content, e.g., an identified author of the item of content, and may generate data representing a network associated with the identified author. For example, the author network assessment module 262 may generate data representing a list of similar authors, e.g., authors that work for the same company, authors with similar writing style, or authors that write about similar subject.

The sentiment analysis module 268 may receive features extracted from an item of content, e.g., the title of the item of content, and may generate data representing a sentiment associated with the extracted features.

Figure 3:
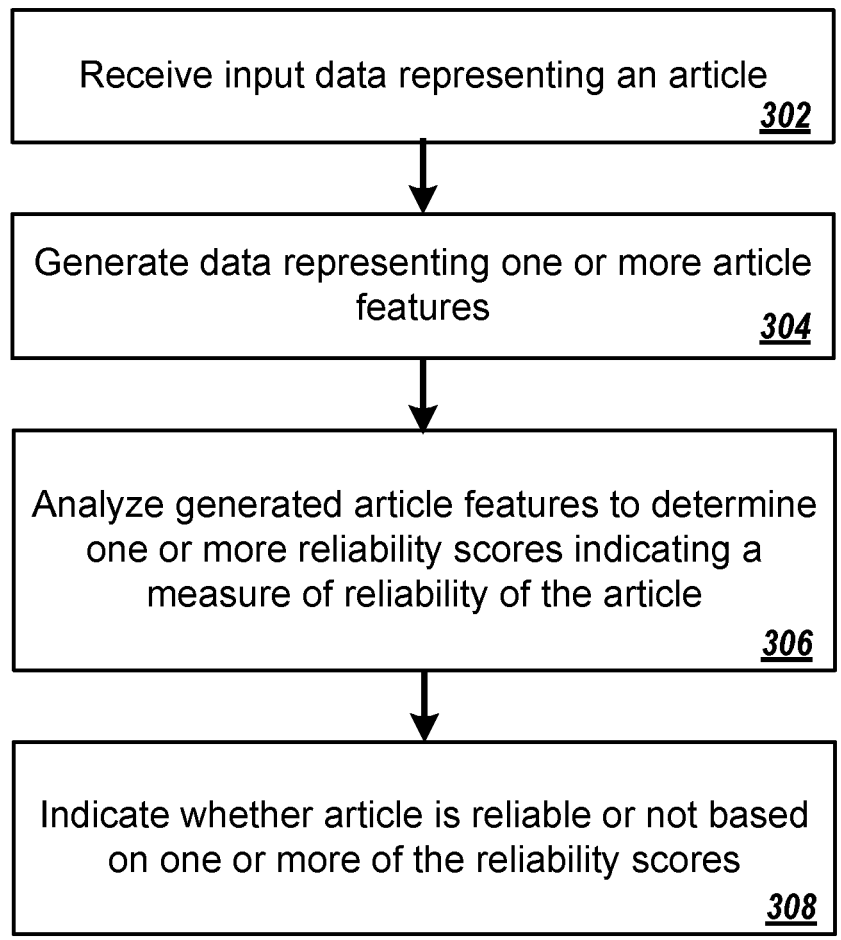
FIG. 3 is a flow chart of an example process for indicating whether an electronic document is reliable or not.

FIG. 3 is a flowchart of an example process 300 for indicating whether an electronic document, e.g., an article, is reliable or not. For convenience, the process 300 will be described as being performed by a system of one or more computers located in one or more locations. For example, a computing system, e.g., the computing system 100 of FIG. 1, appropriately programmed, can perform the process. Although the flowchart depicts the various stages of the process 300 occurring in a particular order, certain stages may in some implementations be performed in parallel or in a different order than what is depicted in the example process 300 of FIG. 3.

The system receives input data in relation to an article (step 302). For example, the input data may represent a piece of writing published in a newspaper, magazine, or other publication. In some implementations the article may be published online, e.g., via a domain associated with a newspaper or magazine, blog, or social networking website.

In some implementations the received input data may further include metadata describing properties of the article, such as its structural content, or feedback data representing crowdsourced information relating to the article.

The system generates data representing one or more features from the article (step 304). For example, the article may include multiple visible features, including but not limited to a title of the article, list of authors and contact information of those who contributed to the article, date of publication of the article, keywords associated with the article, summary or abstract of the article, entities referenced in the article, multimedia content such as images or video included in the article, references or link sources included in the article, font or colours used in the article typeface, or the name of the domain hosting the article.

As another example, the article may include multiple features that are not directly visible, including but not limited to an article sentiment or topic, anomalies that appear in the article, a story the article tells, a network associated with the author, or a network associated with the domain. In these examples, the system may use extracted data representing one or more visible features to generate the non-visible features. For example, the system may use an extracted title and article summary to generate an article sentiment. As another example, the system may use an extracted summary or entities referenced in the article to generate a story that the article is telling, as described above with reference to FIG. 2B.

The system analyzes the generated data to determine one or more reliability scores indicating a measure of reliability of the article (step 306).

The reliability scores may include a content reliability score representing a likelihood that the content of the article is reliable. For example, a first article may be described as being more reliable than a second article is a first content reliability score associated with the first article is higher than a second content reliability score associated with the second article. As another example, the content of an article may be described as being reliable if the content reliability score is greater than a threshold, e.g., a threshold specified by a user of the system. Example processes for analyzing data representing features of an article to determine a content reliability score are described below with reference to FIGS. 4 and 5.

Alternatively or in addition, the reliability scores may include an author reliability score representing a likelihood that articles written by the author are reliable. For example, a first article may be described as being more reliable than a second article is a first author reliability score associated with the first article is higher than a second author reliability score associated with the second article. As another example, an author of an article may be described as being reliable if the author reliability score is greater than a threshold, e.g., a threshold specified by a user of the system. An example process for analyzing data representing features of an article to determine an author reliability score is described below with reference to FIG. 6.

Alternatively or in addition, the reliability scores may include a domain reliability score representing a likelihood that articles hosted on the domain are reliable. For example, a first article may be described as being more reliable than a second article is a first domain reliability score associated with the first article is higher than a second domain reliability score associated with the second article. As another example, the domain hosting an article may be described as being reliable if the domain reliability score is greater than a threshold, e.g., a threshold specified by a user of the system. An example process for analyzing data representing features of an article to determine a domain reliability score is described below with reference to FIG. 7.

The type of values the reliability scores can take are dependent on a system design parameters and may vary. For example, in some implementations the reliability scores may be represented as a percentage or a score out of 10 (or any other number). In cases where the determined reliability scores have different types, the system may convert the scores into a same type. For example, if a determined domain reliability score and author reliability score are represented as percentages, and a determined content reliability score is represented as a score out of 10 (or any other number), e.g., $7/10$, the system may convert the content reliability score into a corresponding percentage, e.g., 70%.

The system indicates, based on one or more of the reliability scores, whether the article is reliable or not (step 308). In some implementations the system may indicate whether the article is reliable or not by aggregating the values of reliability scores determined above with reference to step 306 and determining whether the aggregated score indicates that the article is reliable or not. In other implementations the system may indicate whether the article is reliable or not by analyzing each reliability score determined above with reference to step 306 in turn. Example processes for processing determined reliability scores to indicate whether an article is reliable or not are described below with reference to FIGS. 8 and 9.

In some implementations the system may perform one or more actions in response to indicating whether the article is reliable or not. For example, in response to indicating that the article is unreliable, the system may perform one or more of the following actions: (i) flag the article, (ii) control access to the article, or (iii) censor or moderate some or all of the article. As another example, in response to indicating that the article is reliable, the system may perform one or more of the following actions: (i) upsell the article, or (ii) recommend the author of the article.

In some implementations the system may receive multiple data inputs in relation to respective articles and perform the steps (304-306) described above for each of the multiple data inputs. That is, the system may, for each data input, generate data representing one or more features from the article, analyze the generated data to determine one or more reliability scores indicating a measure of reliability of the article, where the reliability scores comprise one or more of (i) an author reliability score, (ii) a content reliability score, or (iii) a domain reliability score, and indicate, based on one or more of the reliability scores, whether the article is reliable or not.

The system may then use the indications to model the propagation of unreliable articles. For example, the system may identify a subset of articles that each reference a same entity and were indicated as being unreliable. The system may then analyze other features of articles included in the subset of articles, such as domains hosting the articles, date in which the articles were published, authors of the articles, to model the propagation of the unreliable articles. For example, the model may show where (e.g., a domain in which) the unreliable article originated and give a measure of how quickly the article propagated to other locations.

Alternatively or in addition, the system may use the generated features to arrange the multiple articles according to subject and systematically review, based on the indications of reliability, the multiple articles on a given subject. Reviewing the articles on a subject-to-subject basis can enable the system to reliably deal with new content appearing on the internet by identifying common patterns between known unreliable content and new content.

Figure 4:
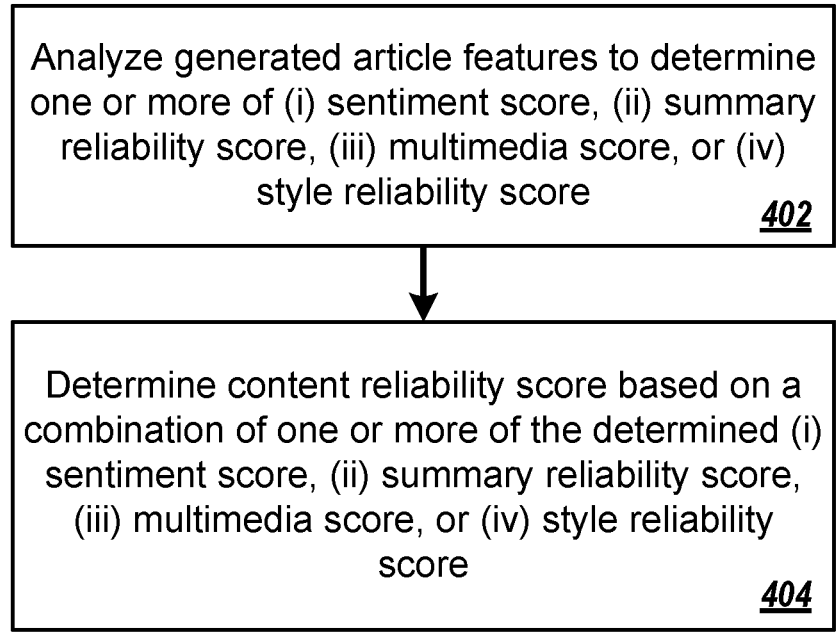
FIG. 4 is a flow chart of a first example process for analyzing data representing features of an electronic document to determine a content reliability score.

FIG. 4 is a flow chart of a first example process 400 for determining a content reliability score for an electronic document, e.g., an article. For convenience, the process 400 will be described as being performed by a system of one or more computers located in one or more locations. For example, a computing system, e.g., the computing system 100 of FIG. 1, appropriately programmed, can perform the process. Although the flowchart depicts the various stages of the process 400 occurring in a particular order, certain stages may in some implementations be performed in parallel or in a different order than what is depicted in the example process 400 of FIG. 4.

The system analyzes data representing one or more features of an article to determine one or more of a (i) sentiment score, (ii) summary reliability score, (iii) multimedia score, or (iv) style reliability score (step 402).

For example, the system may perform sentiment analysis on data representing one or more extracted features, e.g., the article title and a summary of the article, to identify a sentiment associated with the article. The system may then translate the identified sentiment into a sentiment score. For example, a high sentiment score may be used to indicate that that the article has a positive sentiment, whereas a low sentiment score may be used to indicate that the article has a negative sentiment. Sentiment analysis and scores can be used by the system to determine the attitude of the writer/author of the article with respect to different topics, the overall contextual polarity or emotional reaction to an article. For example, the system may determine that a particular author is always negative when writing about a particular entity or topic, which may be used to automatically assign reliability scores or sentiment scores to future articles.

As another example, the system may analyze data representing a summary of the article and data identifying entities referenced in the article to determine a corresponding summary reliability score. For example, the system may process a summary of the article and entities referenced in the article to generate a structured story or pattern that can be compared to other structured stories or patterns that are known to be reliable and factual. For example, the system may identify an appropriate data structure, e.g., "<entity A> performed <activity B> resulting in <action C> at <location D> on <date E>" using the data representing the article summary, and may populate the data structure with data representing identified entities, e.g., "Catherine Middleton performed hospital visit resulting in newly opened pediatrics ward at St Guys on Jul. 15, 2017." The populated data structure may then be compared to pre-approved, reliable versions of similar stores. The system may then use the comparison to determine a corresponding summary reliability score, and to determine a measure of how much the summary deviates from the truth. The same techniques can be applied when determining a content reliability score.

As another example, the system may analyze multimedia content included in the article to determine a multimedia content reliability score. For example, the system may analyze an item of multimedia content included in the article to identify entities shown in the multimedia content, a location associated with the multimedia content, or to identify an approximate time associated with the multimedia content. The system may then compare identified entities, locations or time to other features of the article to determine the multimedia content reliability score.

For example, the system may analyze a photograph included in the article and determine that the photograph shows an image of particular person. The system may then determine whether the particular person is referenced in the article. If the particular person is referenced in the article, the system may assign the multimedia content a high multimedia reliability score, since the multimedia content may be considered to match or corroborate the article. If the particular person is not referenced in the article, the system may assign the multimedia content a low multimedia reliability score, since the multimedia content may not be considered to corroborate the article.

As another example, the system may analyze a video clip included in the article and determine that the video clip was taken at a particular location at a particular event at a particular time and date. The system may then determine whether the location, event, time or date are referred to in the article. If one or more of the location, event, time or date are referred to in the article, the system may assign the multimedia content a high multimedia reliability score, since the multimedia content may be considered to match or corroborate the article. If the location, event, time or date are not referred to in the article, the system may assign the multimedia content a low multimedia reliability score, since the multimedia content may not be considered to corroborate the article.

As another example, the system may identify an author of the article and analyze data representing one or more features of the article, e.g., the summary, main content or title of the article, to determine a corresponding style reliability score that indicates a likelihood that the style of the article matches the author's writing style. For example, the system may store data representing characteristics of different author's styles, e.g., the language in which an author typically writes, frequency phrases or words used, average sentence length, average article length, or use of punctuation. The system may then compare analyzed features of the article to stored data representing style characteristics of the author of the article to determine a style reliability score. If the style of the article matches the known style of the author, the system may assign a high style reliability score. If the style of the article does not match the known style of the author, the system may assign a low style reliability score.

The system determines the content reliability score based on a combination, e.g., a weighted sum, of one or more of the determined (i) sentiment score, (ii) summary reliability score, (iii) multimedia score, or (iv) style reliability score (step 404). The weights in the sum can be specified by a user, i.e., are a system design parameter, and may vary.

Figure 5:
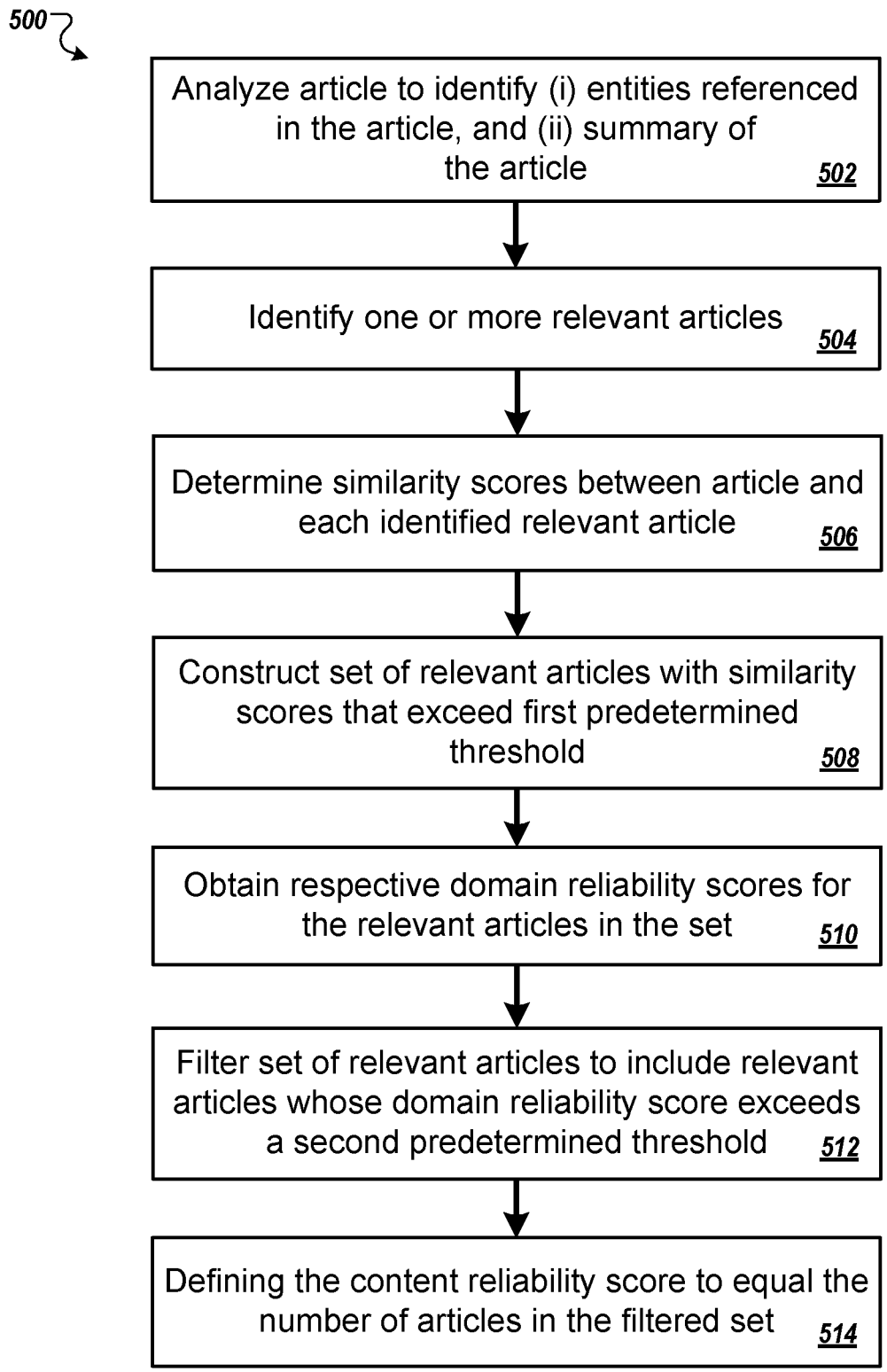
FIG. 5 is flow chart of a second example process for analyzing data representing features of an electronic document to determine a content reliability score for the electronic document.

FIG. 5 is a flow chart of a second example process 500 for determining a content reliability score for an electronic document, e.g., an article. For convenience, the process 500 will be described as being performed by a system of one or more computers located in one or more locations. For example, a computing system, e.g., the computing system 100 of FIG. 1, appropriately programmed, can perform the process. Although the flowchart depicts the various stages of the process 500 occurring in a particular order, certain stages may in some implementations be performed in parallel or in a different order than what is depicted in the example process 500 of FIG. 5.

The system analyzes data representing one or more features of the article to identify (i) one or more entities referenced in the article, and (ii) a summary of the article (step 502). Entities may include but are not limited to people, organizations, institutions, or establishments, e.g., politicians, actors, musicians, writers, directors, television networks, production companies, or governments. The summary of the article may be a direct feature of the article, e.g., specifically titled section of the article or an abstract, or may be generated by the system at step 304 of FIG. 3.

The system searches one or more databases using the identified one or more entities referenced in the article and the summary of the article to identify one or more relevant articles (step 504). For example, the system may search one or more databases to identify articles that also reference an identified entity multiple times. As another example, the system may search one or more databases to identify articles whose summaries have a significant overlap with the identified summary.

The system determines a similarity score between the article and each identified one or more relevant articles (step 506). The similarity score may depend on different measures of similarity and may be determined using standard techniques. For example, the system may determine a number of words that appear in both the article and the one or more relevant articles, i.e., a number of overlapping words.

The system constructs a set of relevant articles with similarity scores that exceed a first predetermined threshold (step 508). In some implementations the first predetermined threshold may be a fixed value that is specified by user input. In other implementations the system may vary the first predetermined threshold based on the number of relevant articles and their respective similarity scores. For example, the system may vary the first predetermined threshold such that the set of relevant articles with similarity scores that exceed the first predetermined threshold includes a predetermined number of relevant articles.

The system obtains, for each of the relevant articles in the set, a respective domain reliability score for the relevant article (step 510). The obtained domain reliability scores for the relevant articles may correspond to previously determined and stored domain reliability scores for the relevant articles.

The system filters the set of relevant articles to include relevant articles whose domain reliability score exceeds a second predetermined threshold (step 512). The second predetermined threshold may be a fixed value specified by user input.

The system defines the content reliability score to equal the number of elements in the filtered set (step 514). In some implementations the defined content reliability score may need to be translated into another format that is compatible with other determined reliability scores. For example, if the set of relevant articles included 13 elements, and the system filtered the set to include only 3 elements, the system may define the content reliability score as being equal to 3/11. This score may be translated into a corresponding percentage, e.g., 27%, and stored.

Figure 6:
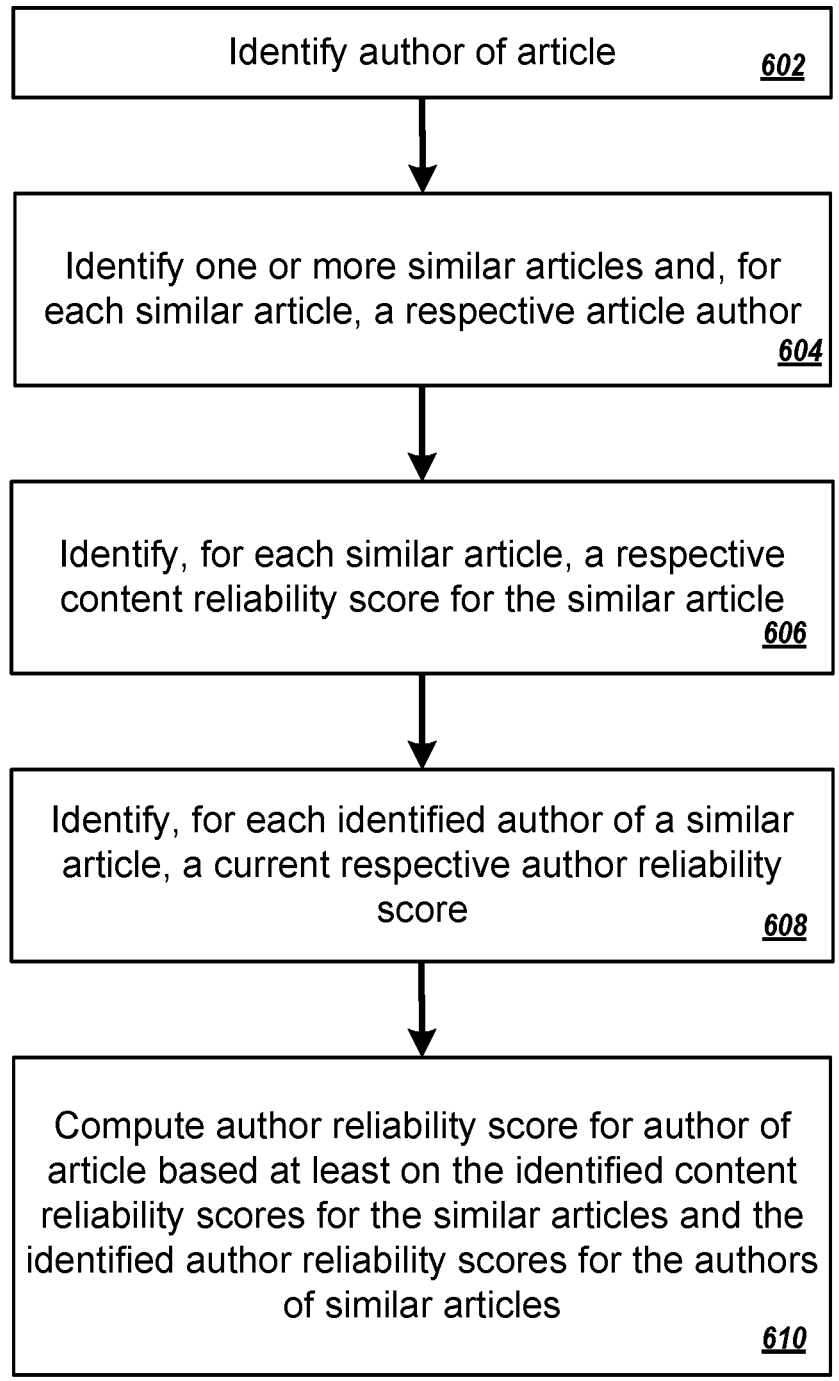
FIG. 6 is a flowchart of an example process for analyzing data representing features of an electronic document to determine an author reliability score for the electronic document.

FIG. 6 is a flowchart of an example process 600 for analyzing generated data representing features of an electronic document, e.g., an article, to determine an author reliability score for the electronic document. For convenience, the process 600 will be described as being performed by a system of one or more computers located in one or more locations. For example, a computing system, e.g., the computing system 100 of FIG. 1, appropriately programmed, can perform the process. Although the flowchart depicts the various stages of the process 600 occurring in a particular order, certain stages may in some implementations be performed in parallel or in a different order than what is depicted in the example process 600 of FIG. 6.

The system identifies an author of the article (step 602). For example, the system may identify an author of the article from generated data representing features of the article as described in step 304 of FIG. 3 above. In cases where the article has multiple authors, the system may identify each author of the article from the generated data representing the features of the article. Alternatively the system may identify the first author only, i.e., the first author appearing in a list of authors, or the last author only, i.e., the last author appearing in a list of authors.

The system identifies, from a database of stored and scored articles, one or more similar articles and, for each similar article, respective authors of the similar article (step 604). For example, the system may apply known techniques to compare the article to the stored and scored articles, e.g., compare the topics, titles, and/or content of the article and the stored articles.

The system identifies, for each similar article, a respective content reliability score for the similar article (step 606).

The system identifies, for each identified author of a similar article, a current respective author reliability score (step 608).

The system computes an author reliability score for author of the article based at least on the identified content reliability scores for the similar articles and the identified author reliability scores for the authors of the similar articles (step 610). In this manner, the author reliability score is comparable to an H-index—an author-level metric that measures the productivity and citation impact of the publications of a scientist or scholar. That is, an author may be assigned a high reliability score if their work is corroborated by other reliable authors.

The computed author reliability score may be associated with a predetermined threshold that can be used to determine whether the author is reliable or not, e.g., if the author reliability score exceeds the predetermined threshold the author may be considered reliable. In cases where a determined author reliability score exceeds the predetermined threshold, the system may store data indicating that the author reliability score is to be fixed at the current value. That is, once an author is determined to be reliable, the system may store data indicating that this author is to be considered reliable in future computations.

In other words, an author is assigned a reliability score, and the author is related to the article they have written. If the article is determined to be reliable and is corroborated by other reliable articles, this in turn adds to the reliability of the author. The more reliable articles the author publishes the more reliable it gets. However, the reliability score is bounded and does not exceed a predetermined limit in order to capture the idea that the system learns to trust authors slowly and loses trust in them quickly.

In some implementations the system may further determine an author authenticity score and adjust the computed author reliability score based on the determined authenticity score. An author authenticity score represents a likelihood that the author of an article is authentic. To determine the author authenticity score, the system may perform multiple checks. For example, the system may identify an email address associated with the author and determine whether the email address is related to a reliable domain. As another example, the system may identify different domains hosting articles written by the author and determine whether the different domains are reliable or not. As another example, the system may access information representing metrics associated with the author's style of writing and compare the style metric with some or all of the article to determine if the style of the article matches the author's style of writing, where example style metrics include words or phrases frequently used, punctuation frequency used, sentence construction, or language of article. Each check that indicates the author is authentic may contribute towards the authenticity score.

In other words, the system may determine the length of sentences included in the article and the frequency of certain words an author uses. The system may represent these features as the style of the author and associate a similarity measure with each one of them, e.g., a mean squared error measure for the average sentence length. The different measures—author authenticity, style, domain reliability—may be combined, e.g., as a weighted sum, to determine an overall author reliability score.

Figure 7:
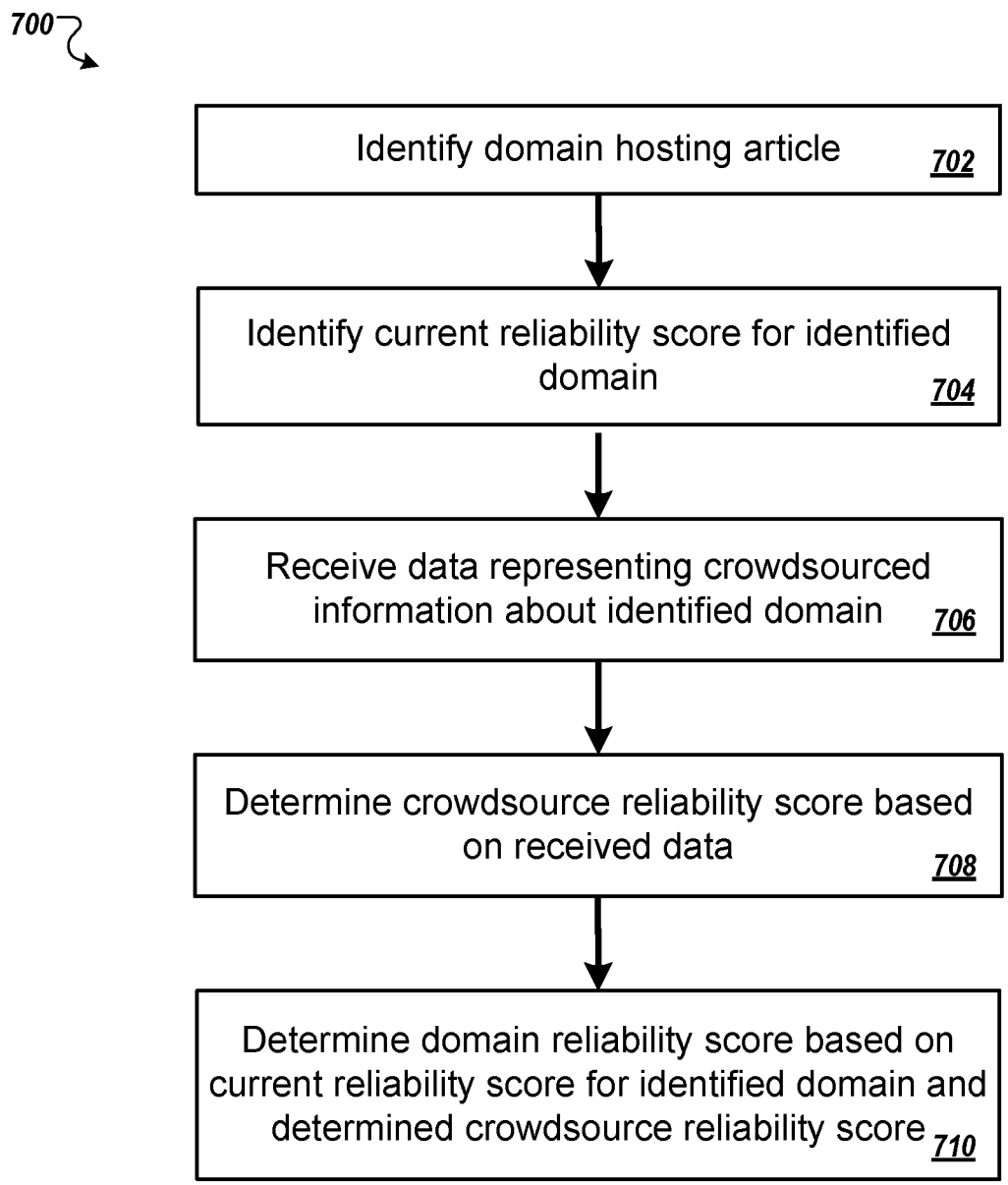
FIG. 7 is a flowchart of an example process for analyzing data representing features of an electronic document to determine a domain reliability score for the electronic document.

FIG. 7 is a flowchart of an example process 700 for analyzing generated data representing features of an electronic document, e.g., an article, to determine a domain reliability score for the electronic document. For convenience, the process 700 will be described as being performed by a system of one or more computers located in one or more locations. For example, a computing system, e.g., the computing system 100 of FIG. 1, appropriately programmed, can perform the process. Although the flowchart depicts the various stages of the process 700 occurring in a particular order, certain stages may in some implementations be performed in parallel or in a different order than what is depicted in the example process 700 of FIG. 7.

The system identifies a domain that is hosting the article (step 702). For example, the system may identify a domain that is hosting the article from the generated data representing features of the article as described in step 304 of FIG. 3 above.

The system identifies, from a database, a current reliability score for the identified domain (step 704). The current reliability score for the identified domain may correspond to a previously determined reliability score for the domain. For example, the system may have previously performed steps 302-306 for multiple other articles, with one or more of the other articles being hosted on the identified domain. The system may therefore identify a reliability score for the domain that corresponds to a most recently determined domain reliability score.

The system receives data in relation to crowdsourced information about the identified domain (step 706). For example, the system may receive data representing crowdsourced information about the identified domain from a crowdsource component that gathers crowdsourced information about various domains. The received data in relation to crowdsourced information about the identified domain may reflect current opinions about the domain or current use of the domain. For example, if the domain has recently been exposed as regularly publishing fake news, the crowdsourced information may include comments or reviews left by internet users complaining or degrading the domain, or may include indications that fewer people are using the domain, e.g., compared to a previous time. As another example, if the domain has recently been praised for publishing accurate articles or has recently hired a renowned journalist, the crowdsourced information may include comments or reviews left by internet users promoting or praising the domain, or may include indications that more people are visiting or subscribing to the domain.

The system determines a crowdsource reliability score based on the received data (step 708). The crowdsource reliability score indicates of whether or not the domain is currently considered to be reliable or not. For example, the crowdsource reliability score may be determined by analyzing the crowdsourced information and determining a ratio of positive comments or reviews to negative comments or reviews. As another example, the crowdsource reliability score may be determined by analyzing the crowdsourced information to determine whether the number of negative comments or reviews exceeds a predetermined threshold. In some implementations the system may scale a determined crowdsource reliability score to match the format as the current domain reliability score, e.g., convert a ratio of negative reviews to positive reviews into a percentage indicating how reliable a domain is considered to be based on the crowdsourced information.

The system determines the domain reliability score based on the current reliability score and the crowdsource reliability score (step 710). For example, the system may determine and select the minimum of the two scores as the domain reliability score. As another example the system may determine and select an average of the two scores as the domain reliability score. As a further example the system may determine and select a combination, e.g., weighted sum, of the two scores as the domain reliability score, where the particular combination or weighting is a system design parameter. The system may further store the determined domain reliability score for future use.

If, at step 704, the system cannot identify a current domain reliability score from the database, e.g., because the domain was not previously analyzed or because the previously determined domain reliability score was erased from the database after a predetermined time period, the system may use the crowdsource reliability score as the determined domain reliability score.

Figure 8:
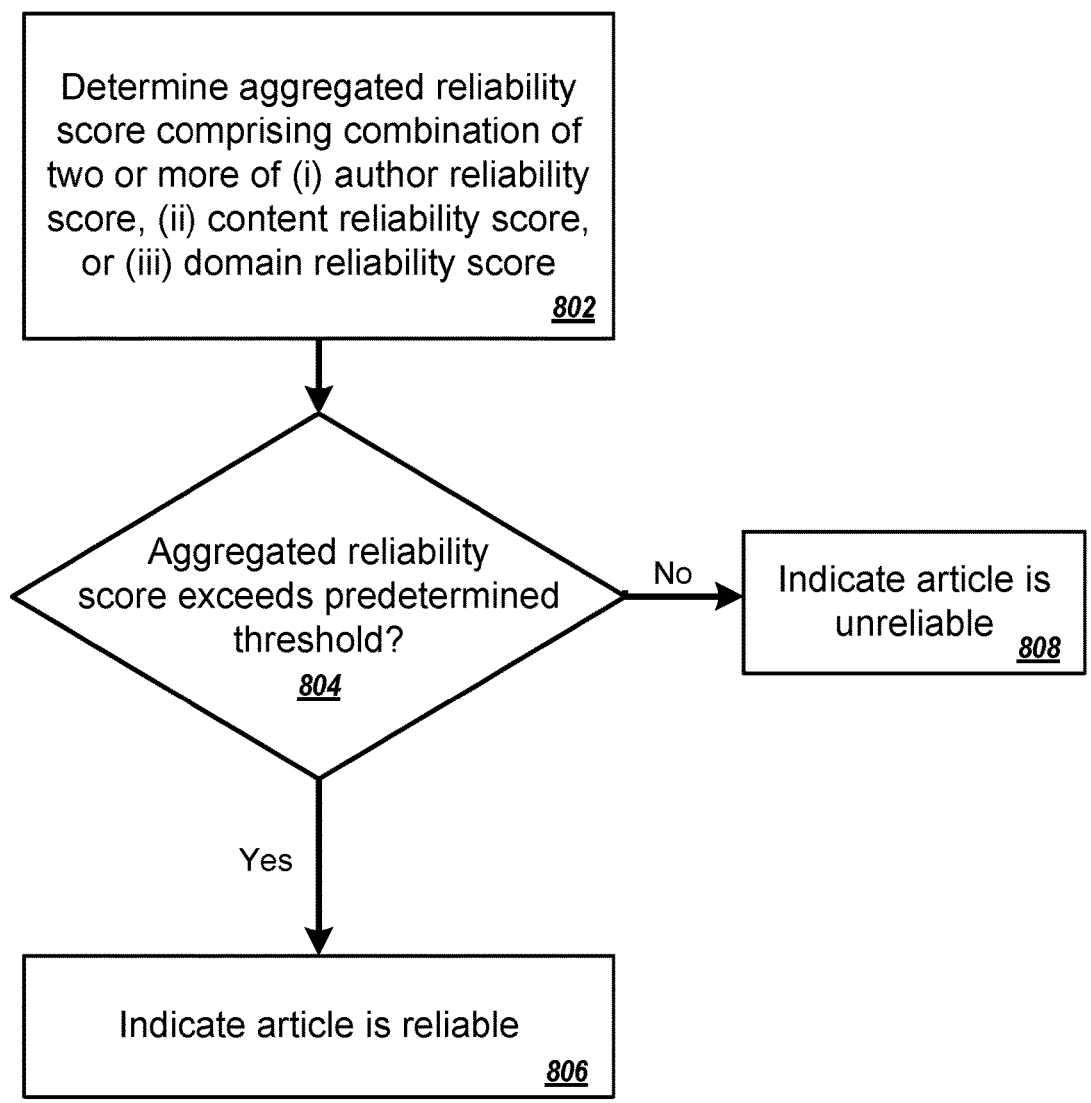
FIG. 8 is a flowchart of a first example process for processing determined reliability scores to indicate whether an electronic document is reliable or not.

FIG. 8 is a flowchart of a first example process 800 for processing determined reliability scores to indicate whether an electronic document, e.g., an article, is reliable or not. For convenience, the process 800 will be described as being performed by a system of one or more computers located in one or more locations. For example, a computing system, e.g., the computing system 100 of FIG. 1, appropriately programmed, can perform the process. Although the flowchart depicts the various stages of the process 800 occurring in a particular order, certain stages may in some implementations be performed in parallel or in a different order than what is depicted in the example process 800 of FIG. 8.

The system determines an aggregated reliability score (step 802). In some implementations the aggregated reliability score may be constructed as a weighted linear combination of two or more of (i) the author reliability score, (ii) the content reliability score, and (iii) the domain reliability score. The weights of the linear combination may be specified via user input, e.g., may be a system design parameters, or may be specified by default values, e.g., may represent an average of the two or more individual reliability scores.

The system determines whether the aggregated reliability score exceeds a predetermined threshold (step 804). In some implementations the predetermined threshold may be specified by user input, e.g., may be a system design parameter. For example, a user may specify that scores above and including 80% indicate reliability whereas scores below and including 79% do not indicate reliability.

In response to determining that the aggregated reliability score exceeds the predetermined threshold, the system indicates that the article is reliable (step 806).

In response to determining that the aggregated reliability score does not exceed the predetermined threshold, the system indicates that the article is unreliable (step 808).

Figure 9:
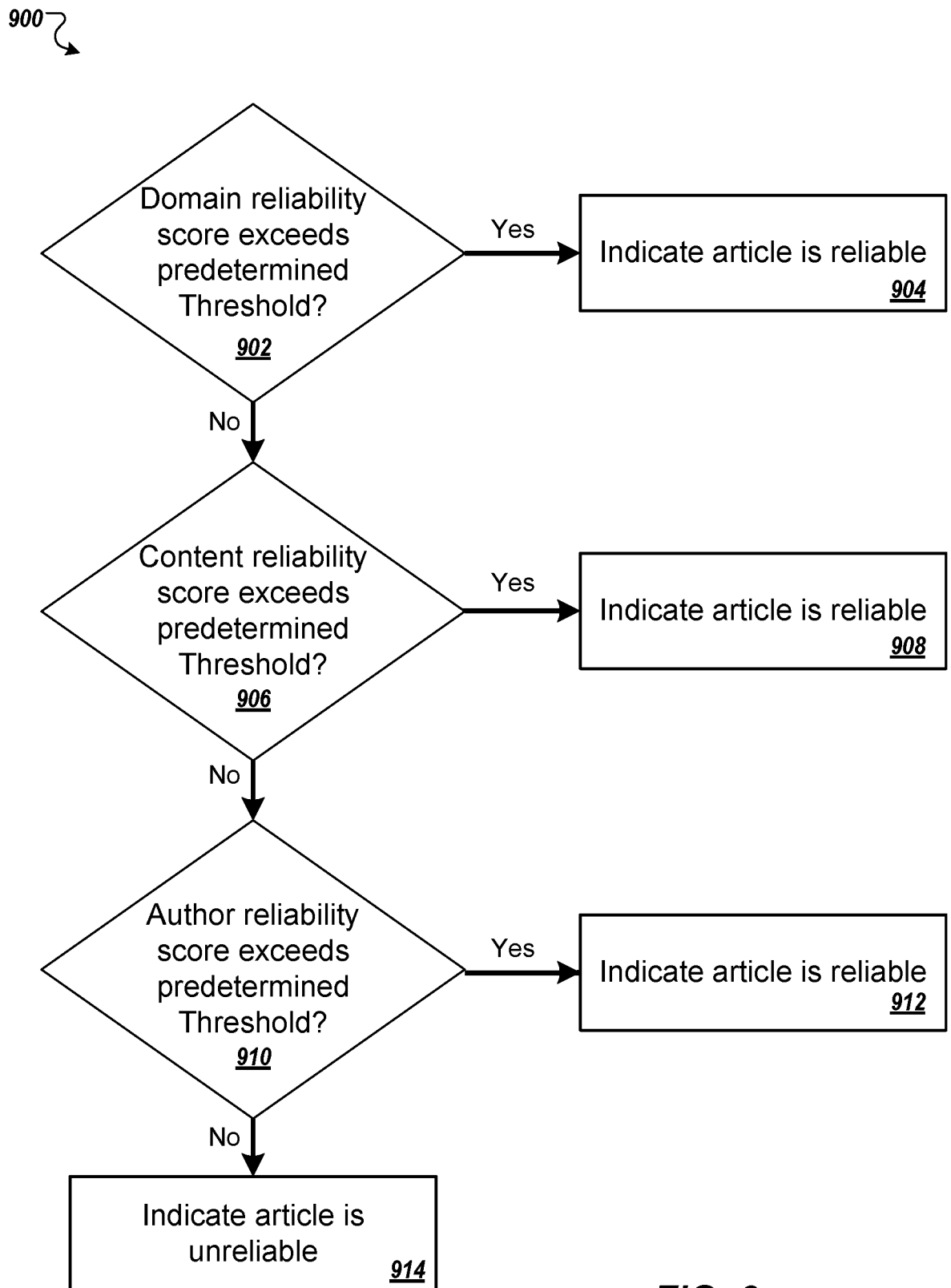
FIG. 9 is a flowchart of a second example process for processing determined reliability scores to indicate whether an electronic document is reliable or not.

FIG. 9 is a flowchart of a second example process 900 for processing determined reliability scores to indicate whether an electronic document, e.g., an article, is reliable or not. For convenience, the process 300 will be described as being performed by a system of one or more computers located in one or more locations. For example, a computing system, e.g., the computing system 100 of FIG. 1, appropriately programmed, can perform the process. Although the flowchart depicts the various stages of the process 900 occurring in a particular order, certain stages may in some implementations be performed in parallel or in a different order than what is depicted in the example process 900 of FIG. 9.

The system determines whether the domain reliability score exceeds a predetermined domain reliability score threshold (step 902). A domain is determined to be reliable, e.g., host reliable electronic articles, if a domain reliability score associated with the domain exceeds the domain reliability score threshold. In some implementations the predetermined domain reliability score threshold may be specified by user input, e.g., may be a system design parameter.

In response to determining that the domain reliability score exceeds the predetermined domain reliability score threshold, the system determines that the article is reliable (step 904). That is, if the article is hosted on a domain that is considered to be reliable, the system indicates that the article is reliable.

In response to determining that the domain reliability score does not exceed the predetermined domain reliability score threshold, the system determines whether the content reliability score exceeds a predetermined content reliability score threshold (step 906). The content of an electronic document is determined to be reliable, e.g., include reliable content, if a content reliability score associated with the content of the electronic document exceeds the content reliability score threshold. That is, if the article is hosted on a domain that is not considered to be reliable, the system further analyzes how reliable the content included in the article is. In some implementations the predetermined content reliability score threshold may be specified by user input, e.g., may be a system design parameter. The predetermined content reliability score threshold may be the same or different to the predetermined domain reliability score threshold. For example, a user may specify that only domains with respective domain reliability scores that exceed 95% are to be considered as reliable domains, whilst items of content with respective content reliability scores that exceed 80% are to be considered as reliable content.

In response to determining that the content reliability score exceeds the predetermined content reliability score threshold, the system indicates that the article is reliable (step 908). That is, if the content of the article is considered to be reliable, despite the domain hosting the article being considered unreliable, the system may generate an indication indicating that the article is reliable.

In response to determining that the content reliability score does not exceed the predetermined content reliability score threshold, the system determines whether the author reliability score exceeds a predetermined author reliability score threshold (step 910). That is, if the article is hosted on a domain that is not considered to be reliable, and the content included in the article is not considered to be reliable, the system further analyzes how reliable the author of the article is. An author is determined to produce reliable electronic documents if an author reliability score associated with the author exceeds the author reliability score threshold. In some implementations the predetermined author reliability score threshold may be specified by user input, e.g., may be a system design parameter. The predetermined author reliability score threshold may be the same as or different to the predetermined domain reliability score threshold and the predetermined content reliability score threshold.

In cases where the article has multiple authors and each author has a respective author reliability score, the system may determine whether each author reliability score exceeds the predetermined author reliability score threshold, or may determine whether an average over all the author reliability scores exceeds the predetermined author reliability score threshold.

In response to determining that the author reliability score exceeds the predetermined author reliability score threshold, the system indicates that the article is reliable (step 912). That is, if the author, one of multiple author, or authors on average are considered to be reliable, despite the domain hosting the article being considered unreliable and the content included in the article being considered unreliable, the system indicates that the article is reliable.

In response to determining that the author reliability score does not exceed the predetermined author reliability score threshold, the system indicates that the article is unreliable (step 914).

By successively applying such thresholds, the system can be tuned towards the sensitivity of the topic or subject of the article. For example, the different thresholds described with reference to FIG. 9 can be selected such that articles relating to trivial topics, e.g., Hollywood gossip, are not heavily controlled whereas articles relating to factual topics of current relevance, e.g., current political decisions, are controlled such that online content relating to such topics is reliable.

Figure 10:
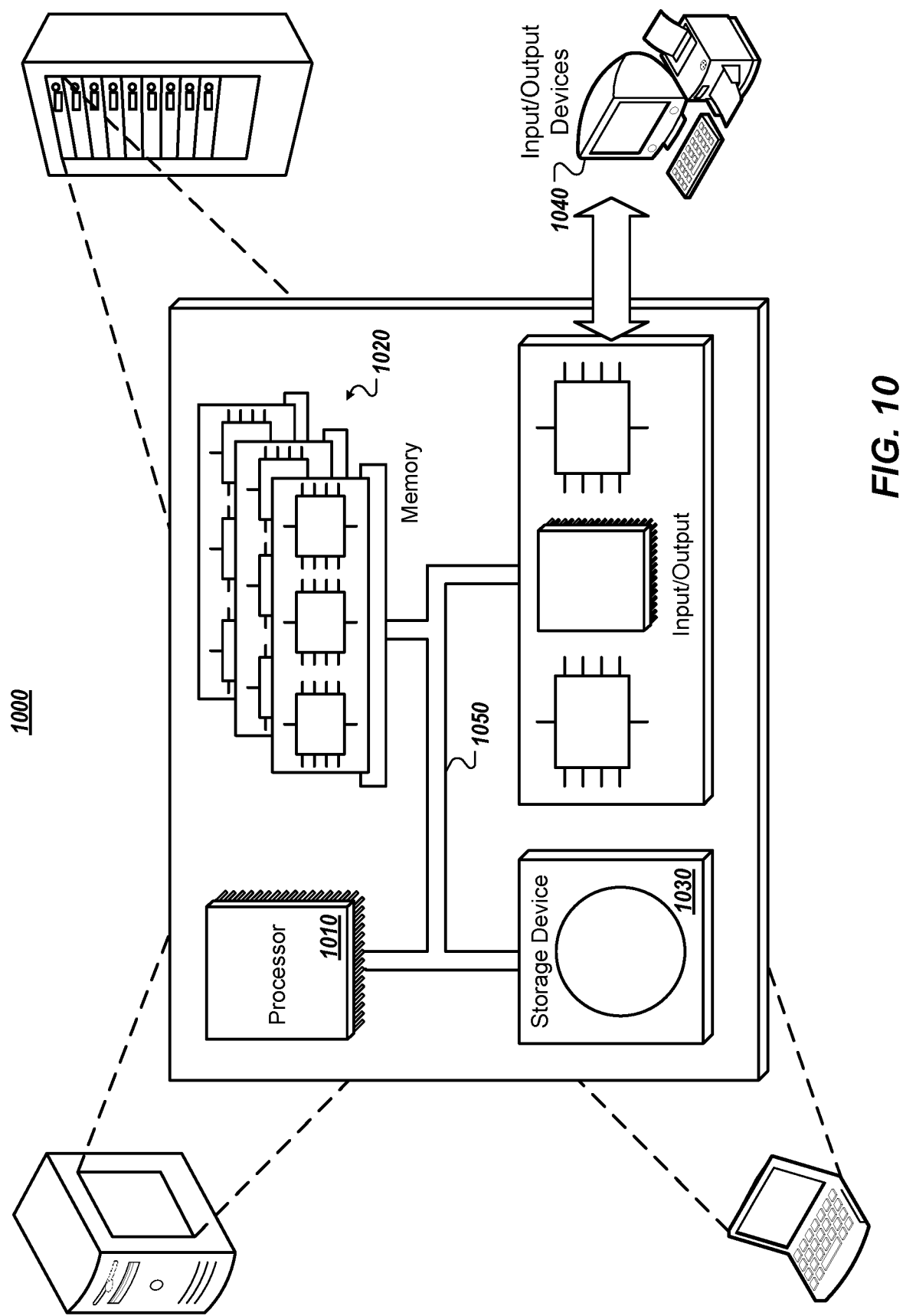
FIG. 10 illustrates a schematic diagram of an exemplary generic computer system.

FIG. 10 illustrates a schematic diagram of an exemplary generic computer system 1000. The system 1000 can be used for the operations described in association with the processes 300-900 described above according to some implementations. The system 1000 is intended to represent various forms of digital computers, such as laptops, desktops, workstations, personal digital assistants, servers, blade servers, mainframes, mobile devices and other appropriate computers. The components shown here, their connections and relationships, and their functions, are exemplary only, and do not limit implementations of the inventions described and/or claimed in this document.

The system 1000 includes a processor 1010, a memory 1020, a storage device 1030, and an input/output device 1040. Each of the components 1010, 1020, 1030, and 1020 are interconnected using a system bus 1050. The processor 1010 may be enabled for processing instructions for execution within the system 1000. In one implementation, the processor 1010 is a single-threaded processor. In another implementation, the processor 1010 is a multi-threaded processor. The processor 1010 may be enabled for processing instructions stored in the memory 1020 or on the storage device 1030 to display graphical information for a user interface on the input/output device 1040.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 may be enabled for providing mass storage for the system 1000. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer implemented method comprising:
   receiving multiple data inputs in relation to respective electronic documents;
   for each electronic document:
      generating, based on the received input data, data representing one or more features of the electronic document, wherein the one or more features comprise: electronic document title, and/or authors of the electronic document, and/or date the electronic document was released, and/or summary of the electronic document, and/or hosted domain, and/or multimedia content included in the electronic document, and/or link sources of the electronic document, and/or references included in the electronic document, and/or style of the electronic document;
      analyzing the generated data representing one or more features of the electronic document to determine one or more reliability scores indicating respective measures of reliability and accuracy of the electronic document, wherein the reliability scores comprise (i) a content reliability score representing a likelihood that the content of the electronic document is accurate and fact-based, and one or more of (ii), an author reliability score representing a likelihood that the author publishes accurate and fact-based documents, and (iii) a domain reliability score representing a likelihood that the domain hosts accurate and fact-based documents, and
      wherein analyzing the generated data to determine a content reliability score for the electronic document comprises:
         analyzing the electronic document to identify (i) one or more entities referenced in the electronic document, and (ii) a summary of the electronic document;
         searching one or more databases using the identified one or more entities referenced in the electronic document and the summary of the electronic document to identify one or more relevant electronic documents;
         determining, a similarity score between the electronic document and each identified one or more relevant electronic documents;
         constructing a set of relevant electronic documents with similarity scores that exceed a first predetermined threshold;
         obtaining, for each of the relevant electronic documents in the set, a respective domain reliability score for the relevant electronic document;
         filtering the set of relevant electronic documents to include relevant electronic documents whose domain reliability score exceeds a second predetermined threshold; and
         defining the content reliability score to equal the number of electronic documents in the filtered set, and
      wherein analyzing the generated data to determine an author reliability score comprises:
         identifying an author of the electronic document;
         identifying, from a database of stored electronic documents, one or more similar electronic documents and, for each similar electronic document, respective authors of the similar electronic document;
         identifying, for each similar electronic document, a respective content reliability score for the similar electronic document;
         identifying, for each identified author of a similar electronic document, a current respective author reliability score; and
         computing an author reliability score for author of the electronic document based at least on the identified content reliability scores for the similar electronic documents and the identified author reliability scores for the authors of the similar electronic documents, and
      wherein analyzing the generated data to determine a domain reliability score comprises:
         identifying a domain that is hosting the electronic document;
         identifying, from a database, a current reliability score for the identified domain;
         receiving data in relation to crowdsourced information about the identified domain;
         determining a crowdsource reliability score based on the received data; and
         determining the domain reliability score based on the current reliability score and the crowdsourced score;
      indicating, based on the content reliability score and one or more of the author reliability score and domain reliability score, whether the electronic document is reliable and accurate or not; and
      in response to indicating that the electronic document is neither reliable nor accurate, flagging the content of the electronic document as fake news;
   identifying a subset of the electronic documents that each reference a same entity and are indicated as unreliable and inaccurate; and
   analyzing other features of electronic documents included in the subset of electronic documents, the other features comprising domains hosting the electronic documents, dates in which the electronic documents were published, and authors of the electronic documents, to model the propagation of the unreliable and inaccurate electronic documents, wherein the model provides i) a domain in which the unreliable and inaccurate documents originated and ii) a measure of how quickly the unreliable and inaccurate documents propagated to other locations.

2. The method of claim 1, wherein analyzing the generated data to determine a content reliability score comprises:
analyzing the one or more features to determine one or more of (i) a sentiment score, (ii) summary reliability score, (iii) multimedia score, or (iv) style reliability score; and
determining the content reliability score based on a combination of one or more of the determined (i) sentiment score, (ii) summary reliability score, (iii) multimedia score, or (iv) style reliability score.

3. The method of claim 1, wherein the method further comprises, in response to determining that the computed author reliability score exceeds a predetermined author reliability threshold, classifying the author as a reliable author and storing data indicating that the author is reliable.

4. The method of claim 1, further comprising:
determining an author authenticity score; and
adjusting the computed author reliability score based on the determined authenticity score.

5. The method of claim 1, wherein determining the domain reliability score based on the current reliability score and the crowdsourced score comprises determining and selecting (i) a minimum, (ii) an average, or (iii) combination of the current reliability score and crowdsourced score.

6. The method of claim 1, wherein analyzing the multimedia content comprises:
performing one or more of (i) image recognition, (ii) video analysis or (iii) object analysis to determine properties of the multimedia content, comprising one or more of (i) objects shown in the multimedia content, (ii) a date of origin of the multimedia content, or (iii) a location shown in the multimedia content.

7. The method of claim 1, further comprising:
in response to indicating that the electronic document is neither reliable nor accurate, (i) controlling access to the electronic document, or (ii) censoring or moderating some or all of the electronic document; and
in response to indicating that the electronic document is reliable and accurate, (i) upselling the electronic document, or (ii) recommending the author of the electronic document.

8. The method of claim 1, further comprising:
receiving multiple data inputs in relation to respective electronic documents;
for each electronic document:
generating data representing one or more features from the electronic document,
analyzing the generated data to determine one or more reliability scores indicating a measure of reliability of the electronic document, wherein the reliability scores comprise one or more of (i) an author reliability score, (ii) a content reliability score, or (iii) a domain reliability score; and
indicating, based on the content reliability score and one or more of the author reliability score and domain reliability score, whether the electronic document is reliable and accurate or not;
arranging the multiple electronic documents according to subject; and
systematically reviewing, based on indicating whether the multiple electronic documents are reliable and accurate or not, the multiple electronic documents on a given subject.

9. The method of claim 1, wherein indicating whether the electronic document is reliable and accurate or not based on the content reliability score and one or more of the author reliability score and domain reliability score comprises:
determining an aggregated reliability score, wherein the aggregated reliability score comprises a weighted linear combination of two or more of (i) the author reliability score, (ii) the content reliability score, and (iii) the domain reliability score;
determining whether the aggregated reliability score exceeds a predetermined threshold;
in response to determining that the aggregated reliability score exceeds the predetermined threshold, indicating that the electronic document is reliable and accurate; and
in response to determining that the aggregated reliability score does not exceed the predetermined threshold, indicating that the electronic document is unreliable and inaccurate.

10. The method of claim 1, wherein indicating whether the electronic document is reliable and accurate or not based on the content reliability score and one or more of the author reliability score and domain reliability score comprises:
determining whether the domain reliability score for the electronic document exceeds a predetermined domain reliability score threshold, wherein a domain is determined to host reliable electronic documents if a domain reliability score associated with the domain exceeds the domain reliability score threshold;
in response to determining that the domain reliability score exceeds the predetermined domain reliability score threshold, indicating that the electronic document is reliable;
in response to determining that the domain reliability score does not exceed the predetermined domain reliability score threshold, determining whether the content reliability score for the electronic document exceeds a predetermined content reliability score threshold, wherein content of an electronic document is determined to comprise reliable content if a content reliability score associated with the content of the electronic document exceeds the content reliability score threshold;
in response to determining that the content reliability score exceeds the predetermined content reliability score threshold, indicating that the electronic document is reliable;
in response to determining that the content reliability score does not exceed the predetermined content reliability score threshold, determining whether the author reliability score for the electronic document exceeds a predetermined author reliability score threshold, wherein an author is determined to produce reliable electronic documents if an author reliability score associated with the author exceeds the author reliability score threshold;
in response to determining that the author reliability score exceeds the predetermined author reliability score threshold, indicating that the electronic document is reliable and accurate;
in response to determining that the author reliability score does not exceed the predetermined author reliability score threshold, indicating that the electronic document is unreliable and inaccurate.

11. A system comprising:

one or more computers; and one or more computer-readable media coupled to the one or more computers having instructions stored thereon which, when executed by the one or more computers, cause the one or more computers to perform operations comprising:

receiving multiple data inputs in relation to respective electronic documents;

for each electronic document:

generating, based on the received input data, data representing one or more features of the electronic document, wherein the one or more features comprise: electronic document title, and/or authors of the electronic document, and/or date the electronic document was released, and/or summary of the electronic document, and/or hosted domain, and/or multimedia content included in the electronic document, and/or link sources of the electronic document, and/or references included in the electronic document, and/or style of the electronic document;

analyzing the generated data representing one or more features of the electronic document to determine one or more reliability scores indicating respective measures of reliability and accuracy of the electronic document, wherein the reliability scores comprise (i) a content reliability score representing a likelihood that the content of the electronic document is accurate and fact-based, and one or more of (ii), an author reliability score representing a likelihood that the author publishes accurate and fact-based documents, and (iii) a domain reliability score representing a likelihood that the domain hosts accurate and fact-based documents, and wherein analyzing the generated data to determine a content reliability score for the electronic document comprises:

analyzing the electronic document to identify (i) one or more entities referenced in the electronic document, and (ii) a summary of the electronic document;

searching one or more databases using the identified one or more entities referenced in the electronic document and the summary of the electronic document to identify one or more relevant electronic documents;

determining, a similarity score between the electronic document and each identified one or more relevant electronic documents;

constructing a set of relevant electronic documents with similarity scores that exceed a first predetermined threshold;

obtaining, for each of the relevant electronic documents in the set, a respective domain reliability score for the relevant electronic document;

filtering the set of relevant electronic documents to include relevant electronic documents whose domain reliability score exceeds a second predetermined threshold; and defining the content reliability score to equal the number of electronic documents in the filtered set, and wherein analyzing the generated data to determine an author reliability score comprises:

identifying an author of the electronic document;

identifying, from a database of stored electronic documents, one or more similar electronic documents and, for each similar electronic document, respective authors of the similar electronic document;

identifying, for each similar electronic document, a respective content reliability score for the similar electronic document;

identifying, for each identified author of a similar electronic document, a current respective author reliability score; and computing an author reliability score for author of the electronic document based at least on the identified content reliability scores for the similar electronic documents and the identified author reliability scores for the authors of the similar electronic documents, and wherein analyzing the generated data to determine a domain reliability score comprises:

identifying a domain that is hosting the electronic document;

identifying, from a database, a current reliability score for the identified domain;

receiving data in relation to crowdsourced information about the identified domain;

determining a crowdsource reliability score based on the received data; and determining the domain reliability score based on the current reliability score and the crowdsourced score;

indicating, based on the content reliability score and one or more of the author reliability score and domain reliability score, whether the electronic document is reliable and accurate or not; and in response to indicating that the electronic document is neither reliable nor accurate, flagging the content of the electronic document as fake news;

identifying a subset of the electronic documents that each reference a same entity and are indicated as unreliable and inaccurate; and analyzing other features of electronic documents included in the subset of electronic documents, the other features comprising domains hosting the electronic documents, dates in which the electronic documents were published, and authors of the electronic documents, to model the propagation of the unreliable and inaccurate electronic documents, wherein the model provides i) a domain in which the unreliable and inaccurate documents originated and ii) a measure of how quickly the unreliable and inaccurate documents propagated to other locations.

12. The system of claim 11, wherein analyzing the generated data to determine a content reliability score comprises:

analyzing the one or more features to determine one or more of (i) a sentiment score, (ii) summary reliability score, (iii) multimedia score, or (iv) style reliability score; and determining the content reliability score based on a combination of one or more of the determined (i) sentiment score, (ii) summary reliability score, (iii) multimedia score, or (iv) style reliability score.

13. One or more non-transitory computer-readable media having instructions stored thereon that, when executed by one or more hardware processors, cause performance of operations comprising:

receiving multiple data inputs in relation to respective electronic documents;

for each electronic document:
- generating, based on the received input data, data representing one or more features of the electronic document, wherein the one or more features comprise: electronic document title, and/or authors of the electronic document, and/or date the electronic document was released, and/or summary of the electronic document, and/or hosted domain, and/or multimedia content included in the electronic document, and/or link sources of the electronic document, and/or references included in the electronic document, and/or style of the electronic document;
- analyzing the generated data representing one or more features of the electronic document to determine one or more reliability scores indicating respective measures of reliability and accuracy of the electronic document, wherein the reliability scores comprise (i) a content reliability score representing a likelihood that the content of the electronic document is accurate and fact-based, and one or more of (ii), an author reliability score representing a likelihood that the author publishes accurate and fact-based documents, and (iii) a domain reliability score representing a likelihood that the domain hosts accurate and fact-based documents, and
- wherein analyzing the generated data to determine a content reliability score for the electronic document comprises:
  - analyzing the electronic document to identify (i) one or more entities referenced in the electronic document, and (ii) a summary of the electronic document;
  - searching one or more databases using the identified one or more entities referenced in the electronic document and the summary of the electronic document to identify one or more relevant electronic documents;
  - determining, a similarity score between the electronic document and each identified one or more relevant electronic documents;
  - constructing a set of relevant electronic documents with similarity scores that exceed a first predetermined threshold;
  - obtaining, for each of the relevant electronic documents in the set, a respective domain reliability score for the relevant electronic document;
  - filtering the set of relevant electronic documents to include relevant electronic documents whose domain reliability score exceeds a second predetermined threshold; and
  - defining the content reliability score to equal the number of electronic documents in the filtered set, and
- wherein analyzing the generated data to determine an author reliability score comprises:
  - identifying an author of the electronic document;
  - identifying, from a database of stored electronic documents, one or more similar electronic documents and, for each similar electronic document, respective authors of the similar electronic document;
  - identifying, for each similar electronic document, a respective content reliability score for the similar electronic document;
  - identifying, for each identified author of a similar electronic document, a current respective author reliability score; and
  - computing an author reliability score for author of the electronic document based at least on the identified content reliability scores for the similar electronic documents and the identified author reliability scores for the authors of the similar electronic documents, and
- wherein analyzing the generated data to determine a domain reliability score comprises:
  - identifying a domain that is hosting the electronic document;
  - identifying, from a database, a current reliability score for the identified domain;
  - receiving data in relation to crowdsourced information about the identified domain;
  - determining a crowdsource reliability score based on the received data; and
  - determining the domain reliability score based on the current reliability score and the crowdsourced score;
- indicating, based on the content reliability score and one or more of the author reliability score and domain reliability score, whether the electronic document is reliable and accurate or not; and
- in response to indicating that the electronic document is neither reliable nor accurate, flagging the content of the electronic document as fake news;

identifying a subset of the electronic documents that each reference a same entity and are indicated as unreliable and inaccurate; and analyzing other features of electronic documents included in the subset of electronic documents, the other features comprising domains hosting the electronic documents, dates in which the electronic documents were published, and authors of the electronic documents, to model the propagation of the unreliable and inaccurate electronic documents, wherein the model provides i) a domain in which the unreliable and inaccurate documents originated and ii) a measure of how quickly the unreliable and inaccurate documents propagated to other locations.

* * * * *